(12) United States Patent
Yonezawa et al.

(10) Patent No.: US 11,577,596 B2
(45) Date of Patent: Feb. 14, 2023

(54) HYBRID VEHICLE AND METHOD OF ENGINE CONTROL OF HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 16/803,249

(22) Filed: Feb. 27, 2020

(65) Prior Publication Data

US 2020/0307369 A1   Oct. 1, 2020

(30) Foreign Application Priority Data

Mar. 26, 2019   (JP) .............................. JP2019-058341

(51) Int. Cl.
| | |
|---|---|
| *F02D 41/00* | (2006.01) |
| *B60K 6/24* | (2007.10) |
| *B60K 6/26* | (2007.10) |
| *B60K 1/02* | (2006.01) |
| *F02M 26/14* | (2016.01) |

(Continued)

(52) U.S. Cl.
CPC ................. *B60K 6/24* (2013.01); *B60K 1/02* (2013.01); *B60K 6/26* (2013.01); *B60K 6/365* (2013.01); *F02B 37/183* (2013.01); *F02M 26/14* (2016.02); *F02M 26/17* (2016.02); *F02M 26/65* (2016.02); *F02M 35/10222* (2013.01); *B60Y 2200/92* (2013.01); *F02D 41/0007* (2013.01)

(58) Field of Classification Search
CPC .......... F02B 37/18; F02B 37/183; B60K 6/24; B60K 6/26; B60K 6/365; B60K 1/02; F02M 26/14; F02M 26/17; F02M 26/65; F02M 35/10222; B60Y 2200/92; F02D 41/0007

See application file for complete search history.

(56) References Cited

U.S. PATENT DOCUMENTS 9,109,505 B2 *   8/2015   Ulrey ...................... F02B 47/08
9,702,296 B2 *   7/2017   Yamagata .............. F02M 26/20
(Continued)

FOREIGN PATENT DOCUMENTS

| CN | 109386408 A | 2/2019 |
|---|---|---|
| JP | 2010-096049 A | 4/2010 |

(Continued)

*Primary Examiner* — Gonzalo Laguarda
(74) *Attorney, Agent, or Firm* — Sughrue Mion, PLLC

(57) ABSTRACT

In a hybrid vehicle, each of an engine and an MG1 is mechanically coupled to a drive wheel with a planetary gear being interposed. The planetary gear and an MG2 are configured such that motive power output from the planetary gear and motive power output from the MG2 are transmitted to the drive wheel as being combined. The engine includes a turbocharger, an EGR valve, and a WGV. When opening of the EGR valve exceeds first opening, a controller maintains opening of the WGV at second opening or larger.

11 Claims, 10 Drawing Sheets

(51) Int. Cl.
  *F02M 26/65* (2016.01)
  *F02M 35/10* (2006.01)
  *F02B 37/18* (2006.01)
  *B60K 6/365* (2007.10)
  *F02M 26/17* (2016.01)

(56) References Cited

U.S. PATENT DOCUMENTS

| | | | | |
|---|---|---|---|---|
| 10,060,365 | B2* | 8/2018 | Zhang | F02M 35/10229 |
| 10,082,092 | B2* | 9/2018 | Zhang | F02D 41/0055 |
| 10,508,591 | B2* | 12/2019 | Upadhyay | F02B 37/18 |
| 10,746,093 | B2* | 8/2020 | Dudar | F02B 37/225 |
| 11,021,154 | B2* | 6/2021 | Yonezawa | B60K 6/28 |
| 11,047,322 | B2* | 6/2021 | Ulrey | F02D 41/0052 |
| 2019/0040791 | A1 | 2/2019 | Ulrey et al. | |
| 2020/0294332 | A1* | 9/2020 | Yonezawa | F02B 37/183 |
| 2020/0325839 | A1* | 10/2020 | Yonezawa | F02D 41/0007 |

FOREIGN PATENT DOCUMENTS

| | | |
|---|---|---|
| JP | 2015-058924 A | 3/2015 |
| JP | 2018-192824 A | 12/2018 |

* cited by examiner

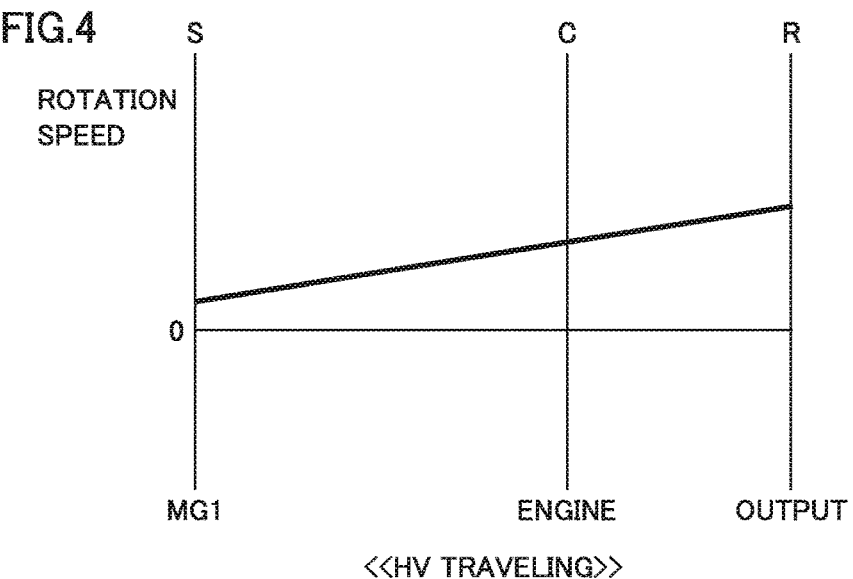
FIG.4 <<HV TRAVELING>>
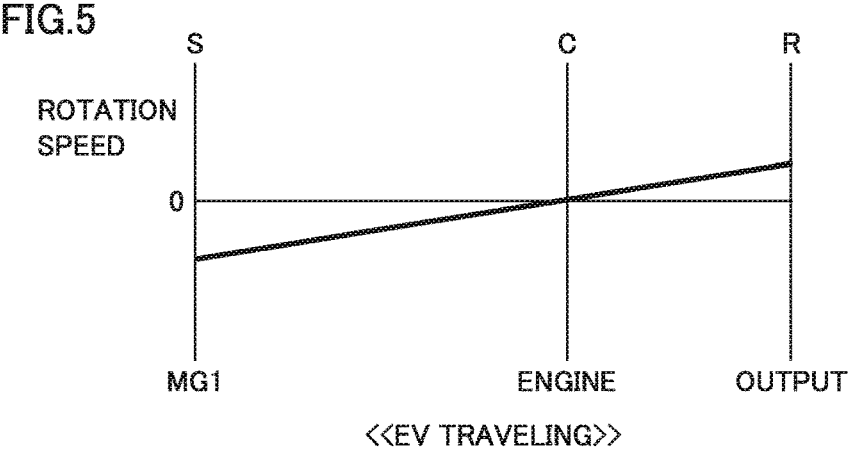
FIG.5 <<EV TRAVELING>>
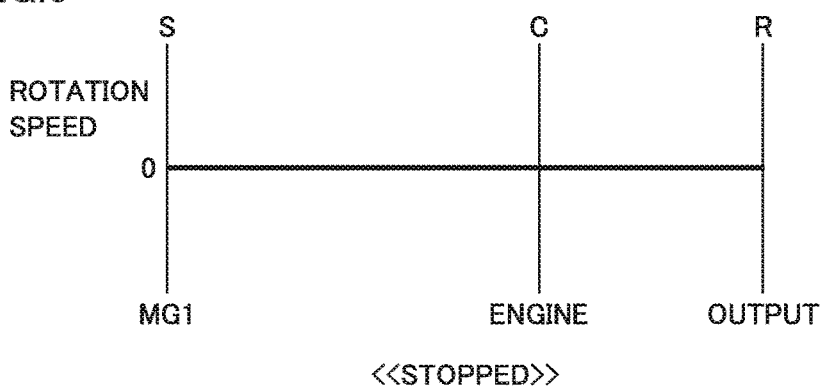
FIG.6 <<STOPPED>>

HYBRID VEHICLE AND METHOD OF ENGINE CONTROL OF HYBRID VEHICLE

This nonprovisional application is based on Japanese Patent Application No. 2019-058341 filed with the Japan Patent Office on Mar. 26, 2019, the entire contents of which are hereby incorporated by reference.

BACKGROUND

Field

The present disclosure relates to a hybrid vehicle and a method of engine control of a hybrid vehicle.

Description of the Background Art

Japanese Patent Laying-Open No. 2018-192824 discloses a hybrid vehicle including an engine and a motor that output motive power to a drive wheel. The engine includes a turbocharger and an exhaust gas recirculation (EGR) apparatus.

SUMMARY

Though mounting an engine including a turbocharger and an EGR apparatus (which is also referred to as a "turbocharged recirculation engine" below) on a hybrid vehicle may be invented desktop as in Japanese Patent Laying-Open No. 2018-192824, actually mounting the turbocharged recirculation engine on the hybrid vehicle and operating the same has not sufficiently been studied.

The inventor of the present application has identified problems that will arise when the hybrid vehicle incorporating the turbocharged recirculation engine is actually operated and studied a hardware configuration and a control method allowing an appropriate operation of the hybrid vehicle incorporating the turbocharged recirculation engine.

The present disclosure was made to solve the problem above, and an object thereof is to provide a hardware configuration and a control method allowing an appropriate operation of a hybrid vehicle incorporating a turbocharged recirculation engine.

A hybrid vehicle according to the present disclosure includes a drive wheel, an engine, a first motor generator (which is also referred to as an "MG1" below), a second motor generator (which is also referred to as an "MG2" below), and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a recirculation path that connects the intake air passage and the exhaust passage to each other without passing through the engine main body, an EGR valve provided in the recirculation path, a turbocharger, a bypass path connected to the exhaust passage, and a waste gate valve (which is also referred to as a "WGV" below) provided in the bypass path. The EGR valve can adjust an amount of exhaust recirculated from the exhaust passage to the intake air passage (which is also referred to as an "EGR recirculation amount" below). The turbocharger includes a compressor provided in the intake air passage and a turbine provided in the exhaust passage. The compressor and the turbine are rotated together. The bypass path allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined. When opening of the EGR valve exceeds first opening, the controller maintains opening of the WGV at second opening or larger. Maintaining opening of the WGV to second opening or larger includes not only opening of the WGV being fixed to a prescribed value equal to or larger than the second opening but also opening of the WGV being varied within a range equal to or larger than the second opening.

In the hybrid vehicle, as the WGV is closed, an amount of exhaust that flows through the turbine increases, a rotation speed of the compressor increases, and forced induction of the engine is performed. As the EGR valve is opened, exhaust is recirculated from the exhaust passage to the intake air passage. Exhaust recirculated from the exhaust passage to the intake air passage is also referred to as "EGR gas" below.

The engine including the turbocharger and the EGR apparatus is large in volume of the intake air passage. Therefore, it is difficult to highly accurately detect an amount of air suctioned into the engine main body and an amount of EGR gas. When a ratio occupied by EGR gas in intake air supplied to the engine main body (which is also referred to as an "EGR ratio" below) is too high, stability of combustion in the engine main body is lowered and accidental fire tends to occur. When forced induction is performed with the WGV being closed while the EGR valve is opened to recirculate exhaust to the engine main body (which is also referred to as a "recirculated state" below), more parameters affect an EGR recirculation amount. Therefore, it is difficult to highly accurately control the EGR recirculation amount. For example, a pressure in the intake air passage may affect the EGR recirculation amount. The pressure in the intake air passage is varied by forced induction. In an engine in which EGR gas is distributed to a plurality of cylinders, a manner of distribution of EGR to each cylinder is different between a case that forced induction is performed and a case that forced induction is not performed. When forced induction is performed in the recirculated state, the EGR ratio tends to excessively be high due to lower accuracy in control of the EGR ratio. The inventor of the present application has further confirmed through experiments that accidental fire occurs in the engine main body at the time of abrupt variation in engine operating point while forced induction is performed with EGR gas remaining in the intake air passage.

With the configuration described above, the hybrid vehicle according to the present disclosure can suppress the EGR ratio becoming excessively high. As opening of the EGR valve is larger, the EGR recirculation amount is larger. When an amount of suctioned air remains the same, the EGR ratio is higher as the EGR recirculation amount is larger. The controller prevents forced induction from being performed by maintaining opening of the WGV at second opening or larger when the EGR ratio may excessively become high (that is, opening of the EGR valve exceeds first opening). Thus, the EGR ratio becoming excessively high can be suppressed and accidental fire in the engine main body is less likely.

In the hybrid vehicle, the engine, the MG1, the MG2, and the planetary gear are in the relation above. The controller can control the engine and the MG1 in coordination to output torque corresponding to engine torque from the planetary gear. The controller can add torque of the MG2 to torque output from the planetary gear. When opening of the WGV is maintained at second opening or larger to lower engine torque and traveling torque is consequently insufficient as described above, insufficiency in traveling torque can be compensated for by the MG2. Therefore, even when opening of the WGV is maintained at second opening or larger so as not to perform forced induction, deterioration in traveling performance due to insufficiency in torque is less likely. Since traveling torque can be adjusted by the MG2, it is less likely that abrupt change in engine torque (and engine operating point) is requested during traveling of the vehicle. Therefore, in the hybrid vehicle, accidental fire due to abrupt change in engine operating point is also less likely. Thus, according to the configuration, the hybrid vehicle incorporating the turbocharged recirculation engine can appropriately be operated.

The controller may permit closing of the WGV to opening smaller than the second opening only when the EGR valve is fully closed. According to such a configuration, for example, by fully closing the EGR valve when increase in engine torque is desired, the WGV can be closed (that is, forced induction can be performed).

When a first requirement is satisfied while the engine is in a first operation state, the controller may control the EGR valve to be opened to opening larger than the first opening with opening of the WGV being maintained at the second opening or larger, and when a second requirement is satisfied while the engine is in a second operation state, the controller may control the WGV to be closed to prescribed opening smaller than second opening (which is also referred to as "turbocharged opening" below) with the EGR valve being maintained in a fully closed state. The first operation state and the second operation state may be operation states that are not simultaneously established.

According to the configuration, the controller selectively uses the EGR apparatus and the turbocharger depending on an operation state of the engine. By setting in advance a state that activation of the EGR apparatus (that is, opening of the EGR valve to opening larger than first opening) is requested as the first operation state and setting in advance a state that activation of the turbocharger (that is, closing of the WGV to opening smaller than second opening) is requested as the second operation state, the engine can appropriately be controlled. Since the first operation state and the second operation state are the operation states that are not simultaneously established, the EGR apparatus and the turbocharger are not simultaneously activated. Thus, the EGR ratio becoming excessively high is suppressed and accidental fire in the engine main body is less likely.

The first operation state and the second operation state may be distinguished from each other based on magnitude of engine torque. Specifically, the first operation state may be defined as a state that torque requested of the engine is smaller than a threshold value. The second operation state may be defined as a state that torque requested of the engine is larger than the threshold value. According to such a configuration, when the second requirement is satisfied while torque requested of the engine is large, the WGV can be closed to turbocharged opening and large engine torque can be obtained owing to forced induction. When the first requirement is satisfied while torque requested of the engine is small, the EGR valve is opened to opening larger than first opening and exhaust emission can be improved. By containing EGR gas in intake air, a temperature of combustion in the engine is lowered and generation of NOx due to combustion is suppressed. The threshold value may be fixed or variable in accordance with a prescribed parameter (for example, an engine rotation speed).

The controller may recognize start of forced induction when opening of the WGV becomes smaller than second opening or recognize start of forced induction (and activation of the turbocharger) when opening of the WGV attains to turbocharged opening. Turbocharged opening may be fixed or variable depending on a situation. A fully closed state may be defined as turbocharged opening.

The hybrid vehicle may further include a first actuator that drives the EGR valve in accordance with a command from the controller and a second actuator that drives the WGV in accordance with a command from the controller. The first requirement includes a requirement that a first time period has elapsed since issuance of a command to fully open the WGV (which is also referred to as a "WGV full-open command" below) from the controller to the second actuator. The second requirement includes a requirement that a second time period has elapsed since issuance of a command to fully close the EGR valve (which is also referred to as an "EGR full-close command" below) from the controller to the first actuator.

When forced induction is stopped with the WGV being fully opened, the engine returns from the forced induction state to a natural aspiration state (which is also referred to as an "NA state" below). It takes some time, however, for the engine to return to the NA state after the WGV is fully opened. According to the configuration, the first requirement is not satisfied (and the EGR valve is not opened to opening larger than first opening) until lapse of the first time period since issuance of the WGV full-open command (that is, a command requesting full opening of the WGV). Thus, activation of the EGR apparatus in the forced induction state is suppressed and accidental fire in the engine main body is suppressed.

As the EGR valve is fully closed, the EGR ratio is lowered. It takes some time, however, for the EGR ratio to attain to a sufficiently small value (and for an amount of EGR gas in the intake air passage to sufficiently be small) after the EGR valve is fully closed. According to the configuration, the second requirement is not satisfied (and the WGV is not closed to opening smaller than the second opening) until lapse of the second time period since issuance of the EGR full-close command (that is, the command requesting full closing of the EGR valve). Thus, accidental fire due to forced induction with EGR gas remaining in the intake air passage is suppressed.

The first requirement may include a requirement that opening of the WGV is equal to or larger than the second opening and a requirement that a boost pressure of the engine is equal to or lower than a prescribed value. The second requirement may include a requirement that the EGR valve is fully closed and a requirement that an EGR ratio is equal to or lower than a prescribed value.

According to the configuration, the first requirement is not satisfied (and the EGR valve is not opened to opening larger than first opening) until the boost pressure is equal to or lower than a prescribed value. Thus, activation of the EGR apparatus in the forced induction state is suppressed and accidental fire in the engine main body is suppressed. The second requirement is not satisfied (and the WGV is not closed to opening smaller than second opening) until the EGR ratio is equal to or lower than a prescribed value. Thus, accidental fire due to forced induction with EGR gas remaining in the intake air passage is suppressed.

A boost pressure of the engine may be detected (that is, actually measured) by a pressure sensor provided in the intake air passage or may be estimated from an engine operation state. The controller may calculate the EGR ratio based on a detection value from each of an air flow meter and a pressure sensor provided in the intake air passage.

For example, the EGR apparatus is activated when opening of the WGV is equal to or larger than second opening and controlled such that opening of the EGR valve is larger than first opening and the EGR recirculation amount attains to a desired value (for example, an amount at which the EGR ratio attains to a target value) while the EGR apparatus is on. When opening of the WGV is equal to or larger than second opening, forced induction of the engine by the turbocharger is not performed. A lower limit value of a range of opening of the EGR valve that can be used in controlling the EGR ratio to a target value may be defined as first opening. First opening may be opening close to the fully closed state or the same as the fully closed state. Second opening may be opening close to the fully opened state or the same as the fully opened state.

The recirculation path may connect a portion of the intake air passage upstream from the compressor and a portion of the exhaust passage downstream from the turbine to each other.

A pressure in a portion of the intake air passage downstream from the compressor becomes higher by forced induction. According to the configuration, however, exhaust is recirculated to a portion upstream from the compressor. Therefore, influence by the boost pressure is less likely when exhaust is recirculated from the exhaust passage to the intake air passage.

A method of engine control of a hybrid vehicle according to the present disclosure is performed in a hybrid vehicle described below and it includes steps A to F described below.

A hybrid vehicle includes a drive wheel, an engine, an MG1, an MG2, and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a recirculation path that connects the intake air passage and the exhaust passage to each other without passing through the engine main body, an EGR valve provided in the recirculation path, a turbocharger, a bypass path connected to the exhaust passage, and a WGV provided in the bypass path. The EGR valve can adjust an EGR recirculation amount. The turbocharger includes a compressor provided in the intake air passage and a turbine provided in the exhaust passage. The compressor and the turbine are rotated together. The bypass path allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined.

In step A, the controller determines whether or not both of a first condition and a second condition are satisfied. The first condition is a condition that opening of the EGR valve is not prohibited. The second condition is a condition that an EGR execution condition is satisfied.

In step B, when the controller determines that the first and second conditions are satisfied, the controller controls the EGR valve to be opened to opening larger than first opening after setting opening of the WGV to second opening or larger, and prohibits closing of the WGV to opening smaller than the second opening.

In step C, when an EGR stop condition is satisfied while the EGR valve is opened to opening larger than the first opening, the controller cancels prohibition of closing of the WGV to opening smaller than the second opening after fully closing the EGR valve.

In step D, the controller determines whether or not both of a third condition and a fourth condition are satisfied. The third condition is a condition that closing of the WGV to opening smaller than the second opening is not prohibited. The fourth condition is a condition that a forced induction execution condition is satisfied.

In step E, when the controller determines that the third and fourth conditions are satisfied, the controller controls the WGV to be closed to opening smaller than the second opening after fully closing the EGR valve, and prohibits opening of the EGR valve.

In step F, when a forced induction stop condition is satisfied while the WGV is closed to opening smaller than the second opening, the controller cancels prohibition of opening of the EGR valve after setting opening of the WGV to the second opening or larger.

According to the method, when the EGR valve is opened to opening larger than the first opening, closing of the WGV to opening smaller than the second opening is prohibited and opening of the WGV is maintained at second opening or larger. When the WGV is closed to opening smaller than the second opening, opening of the EGR valve is prohibited and the EGR valve is maintained in the fully closed state. The EGR ratio becoming excessively high is thus suppressed and accidental fire in the engine main body is less likely. According to the method, the hybrid vehicle incorporating the turbocharged recirculation engine can appropriately be operated.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a nomographic chart showing exemplary relation among rotation speeds of rotary elements (a sun gear, a carrier, and a ring gear) of a planetary gear during HV traveling, in the hybrid vehicle according to the embodiment of the present disclosure.

FIG. 5 is a nomographic chart showing exemplary relation among rotation speeds of rotary elements (the sun gear, the carrier, and the ring gear) of the planetary gear during EV traveling, in the hybrid vehicle according to the embodiment of the present disclosure.

FIG. 6 is a nomographic chart showing exemplary relation among rotation speeds of rotary elements (the sun gear, the carrier, and the ring gear) of the planetary gear while the vehicle is stopped, in the hybrid vehicle according to the embodiment of the present disclosure.

DESCRIPTION OF THE PREFERRED EMBODIMENTS

Figure 1:
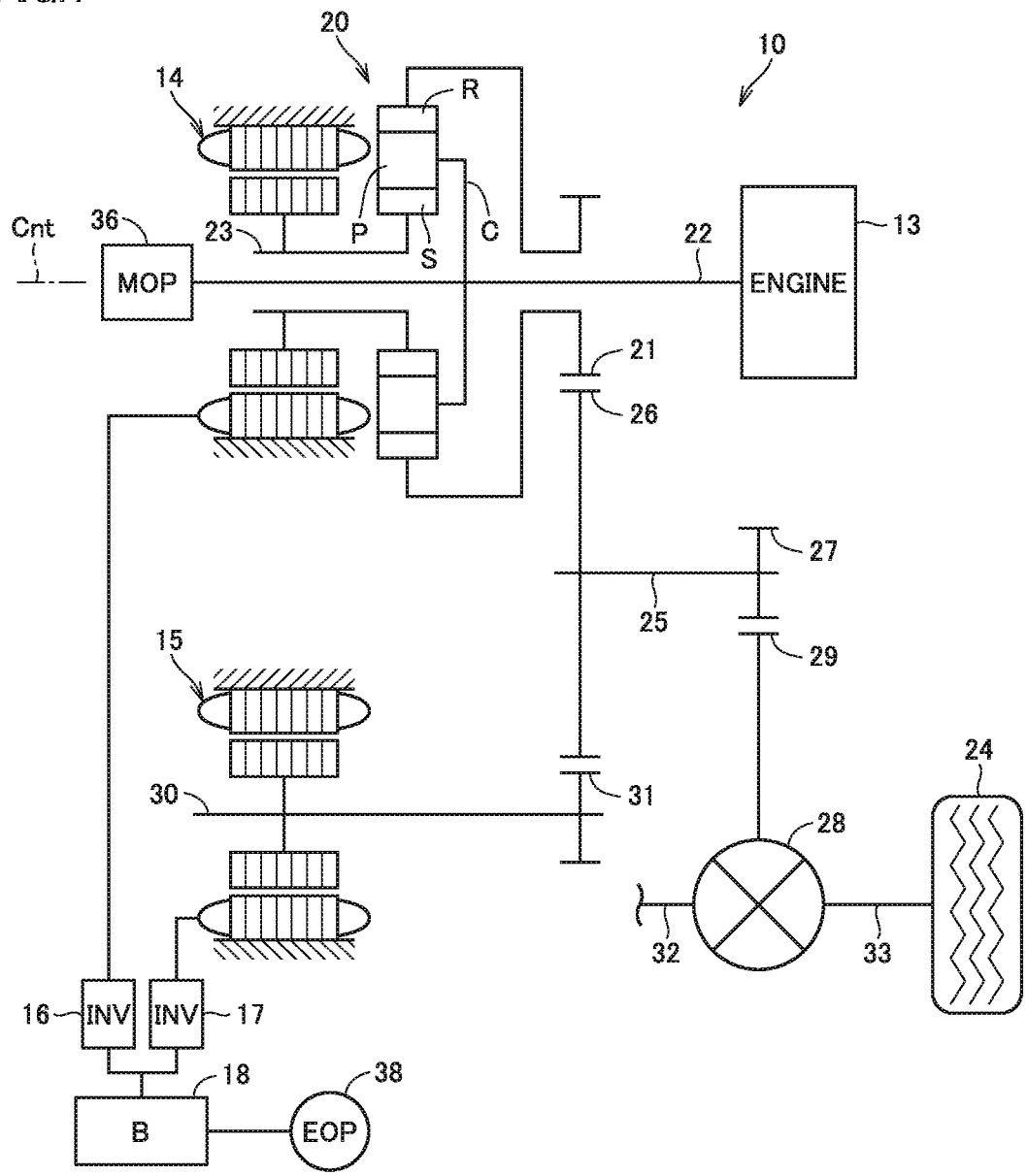
FIG. 1 is a diagram showing a drive device of a hybrid vehicle according to an embodiment of the present disclosure.

An embodiment of the present disclosure will be described in detail below with reference to the drawings. The same or corresponding elements in the drawings have the same reference characters allotted and description thereof will not be repeated. An electronic control unit is also referred to as an "ECU" below. A hybrid vehicle is also referred to as an "HV" and an electric vehicle is also referred to as an "EV".

FIG. 1 is a diagram showing a drive device of a hybrid vehicle according to this embodiment. Though a front-wheel drive four-wheel hybrid vehicle is assumed in the embodiment, the number of wheels and a drive scheme can be modified as appropriate.

Referring to FIG. 1, a drive device 10 of the hybrid vehicle (which is also simply referred to as a "vehicle" below) includes an engine 13 and motor generators (MGs) 14 and 15 as sources of motive power for traveling. Each of MGs 14 and 15 is a motor generator that performs both of a function as a motor that outputs torque by being supplied with driving electric power and a function as a generator that generates electric power by being supplied with torque. An alternating current (AC) motor (for example, a permanent magnet synchronous motor or an induction motor) is employed for each of MGs 14 and 15. MG 14 is electrically connected to a battery 18 with a first electric circuit being interposed. The first electric circuit includes a first inverter 16. MG 15 is electrically connected to battery 18 with a second electric circuit being interposed. The second electric circuit includes a second inverter 17. MGs 14 and 15 include rotor shafts 23 and 30, respectively. Rotor shafts 23 and 30 correspond to rotation shafts of MGs 14 and 15, respectively. MG 14 and MG 15 according to the embodiment correspond to an exemplary "first motor generator (MG1)" and an exemplary "second motor generator (MG2)" according to the present disclosure, respectively.

Battery 18 includes, for example, a secondary battery. For example, a lithium ion battery can be adopted as the secondary battery. Battery 18 may include a battery assembly constituted of a plurality of electrically connected secondary batteries (for example, lithium ion batteries). The secondary battery constituting battery 18 is not limited to the lithium ion battery but another secondary battery (for example, a nickel metal hydride battery) may be applicable. A liquid electrolyte secondary battery or an all-solid-state secondary battery may be adopted as battery 18. Any power storage can be adopted as battery 18 and a large capacity capacitor can also be adopted.

Drive device 10 includes a planetary gear mechanism 20. Engine 13 and MG 14 are coupled to planetary gear mechanism 20. Planetary gear mechanism 20 is a single-pinion planetary gear and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Each of engine 13 and MG 14 is mechanically coupled to a drive wheel 24 with planetary gear mechanism 20 being interposed. Engine 13 has output shaft 22 coupled to carrier C. MG 14 has rotor shaft 23 coupled to sun gear S. Ring gear R is coupled to an output gear 21.

In planetary gear mechanism 20, carrier C serves as an input element, ring gear R serves as an output element, and sun gear S serves as a reaction force element. Torque output from engine 13 is input to carrier C. Planetary gear mechanism 20 transmits torque output from engine 13 to output shaft 22 by dividing torque into torque to sun gear S (and to MG 14) and torque to ring gear R (and to output gear 21). Ring gear R outputs torque to output gear 21 and reaction torque is applied to sun gear S by MG 14. Motive power output from planetary gear mechanism 20 (planetary gear) (that is, motive power output to output gear 21) is transmitted to drive wheel 24 through a driven gear 26, a countershaft 25, a drive gear 27, a differential gear 28, and driveshafts 32 and 33 which will be described below.

Drive device 10 further includes countershaft 25, driven gear 26, drive gear 27, differential gear 28, a drive gear 31, and driveshafts 32 and 33. Differential gear 28 corresponds to a final reduction gear and includes a ring gear 29.

Planetary gear mechanism 20 and MG 15 are configured such that motive power output from planetary gear mechanism 20 and motive power output from MG 15 are transmitted to drive wheel 24 as being combined. Specifically, output gear 21 coupled to ring gear R of planetary gear mechanism 20 is meshed with driven gear 26. Drive gear 31 attached to rotor shaft 30 of MG 15 is also meshed with driven gear 26. Countershaft 25 is attached to driven gear 26 and arranged in parallel to axis Cnt. Drive gear 27 is attached to countershaft 25 and meshed with ring gear 29 of differential gear 28. Driven gear 26 functions to combine torque output to rotor shaft 30 by MG 15 and torque output from ring gear R to output gear 21. Drive torque thus combined is transmitted to drive wheel 24 through driveshafts 32 and 33 extending laterally from differential gear 28.

Drive device 10 further includes a mechanical oil pump 36 and an electric oil pump 38. Oil pump 36 is provided coaxially with output shaft 22. Oil pump 36 is driven by engine 13. Oil pump 36 delivers lubricating oil to planetary gear mechanism 20, MG 14, MG 15, and differential gear 28 while engine 13 is on. Electric oil pump 38 is driven by electric power supplied by battery 18 or a not-shown another vehicle-mounted battery (for example, an auxiliary battery) and controlled by an HVECU 62 (see FIG. 3) which will be described later. Electric oil pump 38 delivers lubricating oil to planetary gear mechanism 20, MG 14, MG 15, and differential gear 28 while engine 13 is off. Lubricating oil delivered by each of oil pump 36 and electric oil pump 38 has a cooling function.

Figure 2:
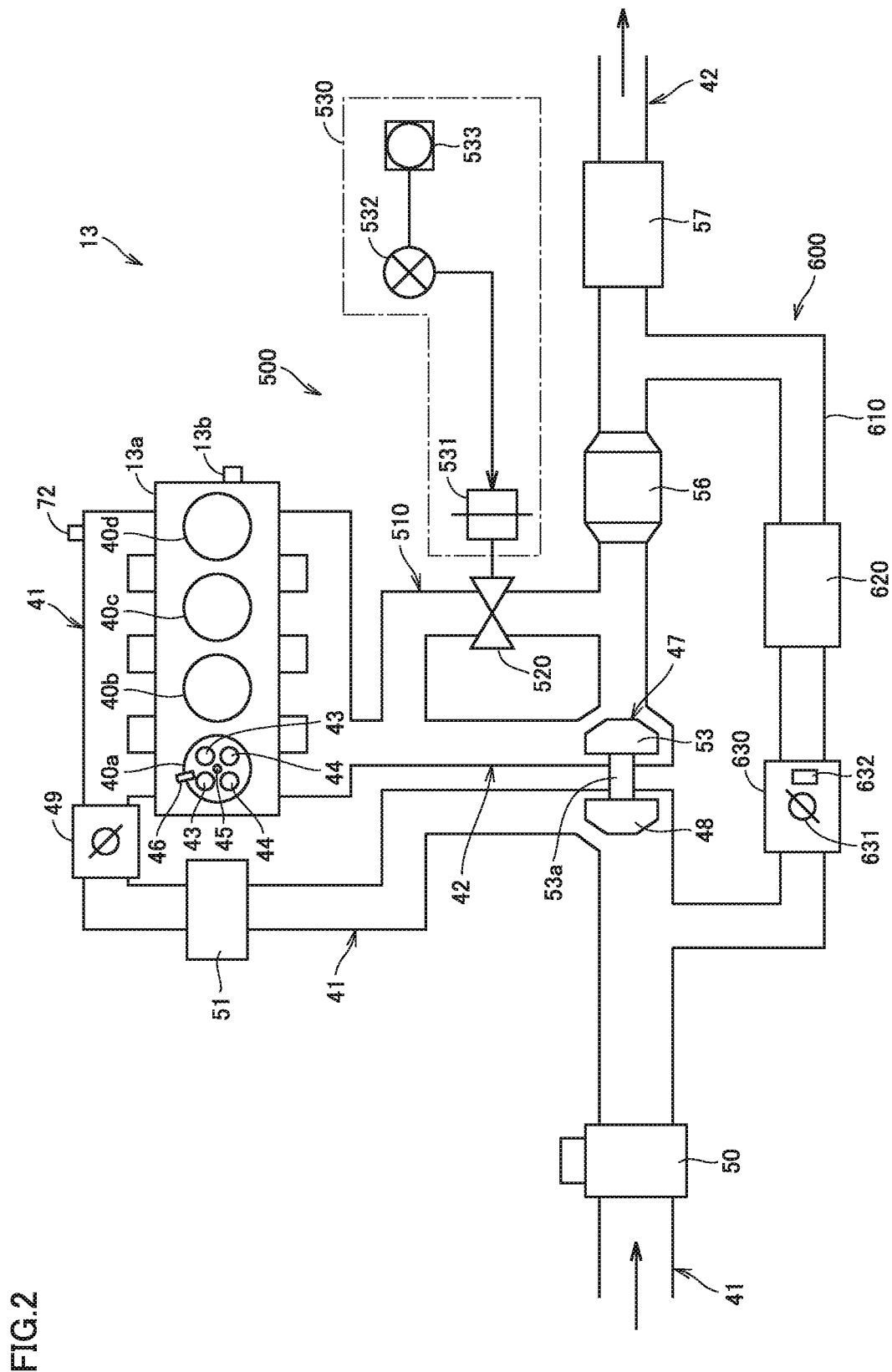
FIG. 2 is a diagram showing an engine of the hybrid vehicle according to the embodiment of the present disclosure.

FIG. 2 is a diagram showing a configuration of engine 13. Referring to FIG. 2, engine 13 is, for example, an in-line four-cylinder spark ignition internal combustion engine. Engine 13 includes an engine main body 13a including four cylinders 40a, 40b, 40c, and 40d. In engine main body 13a, four cylinders 40a, 40b, 40c, and 40d are aligned in one direction. Each of cylinders 40a, 40b, 40c, and 40d will be denoted as a "cylinder 40" below unless they are explained as being distinguished from one another.

An intake air passage 41 and an exhaust passage 42 are connected to each cylinder 40 of engine main body 13a. Intake air passage 41 is opened and closed by two intake valves 43 provided in each cylinder 40, and exhaust passage 42 is opened and closed by two exhaust valves 44 provided in each cylinder 40. An air fuel mixture of air and fuel (for example, gasoline) is generated by adding fuel to air supplied to engine main body 13a through intake air passage 41. Fuel is injected into cylinder 40 by an injector 46 provided, for example, for each cylinder 40 and the air fuel mixture is generated in cylinder 40. An ignition plug 45 provided for each cylinder 40 ignites the air fuel mixture in cylinder 40. Combustion is thus performed in each cylinder 40. Combustion energy generated at the time of combustion of the air fuel mixture in each cylinder 40 is converted to kinetic energy by a piston (not shown) in each cylinder 40 and output to output shaft 22 (FIG. 1). A fuel supply scheme is not limited to direct injection, and may be port injection or both of direct injection and port injection.

A water jacket is formed in a cylinder block (not shown) in engine main body 13a and cooling water for engine main body 13a flows through the water jacket. Engine main body 13a is provided with a cooling water temperature sensor 13b that outputs to HVECU 62, a signal in accordance with a temperature of cooling water (which is also referred to as an "engine cooling water temperature" below) that flows through the water jacket.

Engine 13 includes a turbocharger 47 that uses exhaust energy to boost suctioned air. Turbo charger 47 includes a compressor 48, a turbine 53, and a shaft 53a. Compressor 48 and turbine 53 are coupled to each other with shaft 53a being interposed and rotated together. Rotational force of turbine 53 rotated by receiving a flow of exhaust emitted from engine main body 13a is transmitted to compressor 48 through shaft 53a. As compressor 48 is rotated, intake air toward engine main body 13a is compressed and compressed air is supplied to engine main body 13a. Turbocharger 47 boosts suctioned air (that is, increases a density of air suctioned into engine main body 13a) by rotating turbine 53 and compressor 48 by using exhaust energy.

Compressor 48 is arranged in intake air passage 41. An air flow meter 50 is provided at a position upstream from compressor 48 in intake air passage 41. Air flow meter 50 outputs a signal in accordance with a flow rate of air that flows through intake air passage 41. An intercooler 51 is provided at a position downstream from compressor 48 in intake air passage 41. Intercooler 51 cools intake air compressed by compressor 48. A throttle valve (intake throttle valve) 49 is provided at a position downstream from intercooler 51 in intake air passage 41. Throttle valve 49 can regulate a flow rate of intake air that flows through intake air passage 41. In the embodiment, a valve continuously variable in opening (which is also referred to as a "continuously variable valve" below) within a range from a fully closed state to a fully opened state is adopted as throttle valve 49. Opening of throttle valve 49 is controlled by HVECU 62 (see FIG. 3) which will be described later. Air that flows into intake air passage 41 is supplied to each cylinder 40 of engine main body 13a sequentially through air flow meter 50, compressor 48, intercooler 51, and throttle valve 49 in this order.

Turbine 53 is arranged in exhaust passage 42. A start catalyst converter 56 and an aftertreatment apparatus 57 are provided downstream from turbine 53 in exhaust passage 42. In exhaust passage 42, a WGV apparatus 500 described below is further provided.

WGV apparatus 500 allows exhaust emitted from engine main body 13a to flow as bypassing turbine 53, and can adjust an amount of bypassed exhaust. WGV apparatus 500 includes a bypass path 510, a waste gate valve (WGV) 520, and a WGV actuator 530. WGV actuator 530 according to the embodiment corresponds to an exemplary "second actuator" according to the present disclosure.

Bypass path 510 is connected to exhaust passage 42 and allows exhaust to flow therethrough as bypassing turbine 53. Bypass path 510 is branched from a portion of exhaust passage 42 upstream from turbine 53 (for example, between engine main body 13a and turbine 53) and is merged with a portion of exhaust passage 42 downstream from turbine 53 (for example, between turbine 53 and start catalyst converter 56).

WGV 520 is arranged in bypass path 510 and can regulate a flow rate of exhaust guided from engine main body 13a to bypass path 510. As a flow rate of exhaust guided from engine main body 13a to bypass path 510 increases, a flow rate of exhaust guided from engine main body 13a to turbine 53 decreases. Depending on opening of WGV 520, a flow rate of exhaust that flows into turbine 53 (and a boost pressure) is varied. As WGV 520 is closed (that is, closer to a fully closed state), a flow rate of exhaust that flows into turbine 53 increases and a pressure of suctioned air (that is, a boost pressure) is higher. Opening of WGV 520 is controlled by HVECU 62 (see FIG. 3) which will be described later. HVECU 62 controls WGV 520 to fully be closed in performing forced induction. WGV 520 being fully closed means that turbocharger 47 is on.

WGV 520 is a negative pressure driven valve driven by WGV actuator 530. WGV actuator 530 includes a negative pressure driven diaphragm 531, a negative pressure regulation valve 532, and a negative pressure pump 533. Diaphragm 531 is coupled to WGV 520 and WGV 520 is driven by a negative pressure introduced into diaphragm 531. In the embodiment, WGV 520 is a normally open valve and opening of WGV 520 is smaller as the negative pressure applied to diaphragm 531 is larger in magnitude. Negative pressure pump 533 is connected to diaphragm 531 with negative pressure regulation valve 532 being interposed.

Negative pressure pump 533 is a mechanical pump (for example, a vane type mechanical pump) driven by engine 13. Negative pressure pump 533 generates a negative pressure with motive power output to output shaft 22 (FIG. 1) of engine 13. While engine 13 is on, negative pressure pump 533 is also on, and when engine 13 is stopped, negative pressure pump 533 is also stopped. Negative pressure regulation valve 532 can regulate magnitude of a negative pressure applied to diaphragm 531. As opening of negative pressure regulation valve 532 is larger, a negative pressure applied to diaphragm 531 is larger in magnitude. Negative pressure regulation valve 532 is controlled by HVECU 62 (see FIG. 3) which will be described later. In the embodiment, a two-position electromagnetic valve that can alternatively select any one of a fully open (communicating) state and a fully closed (cut-off) state is adopted for negative pressure regulation valve 532.

Exhaust emitted from engine main body 13a passes through any of turbine 53 and WGV 520 and emitted into the atmosphere after air pollutants are removed therefrom by start catalyst converter 56 and aftertreatment apparatus 57. Each of start catalyst converter 56 and aftertreatment apparatus 57 contains a catalyst for purification of exhaust (for example, a three-way catalyst). Since start catalyst converter 56 is arranged upstream from aftertreatment apparatus 57 in exhaust passage 42, a temperature of start catalyst converter 56 reaches an activation temperature in a short period of time after start of engine 13. Aftertreatment apparatus 57 purifies air pollutants (for example, HC, CO, and NOx) that could not be purified by start catalyst converter 56.

Engine 13 further includes an exhaust gas recirculation (EGR) apparatus 600. EGR apparatus 600 can recirculate some of exhaust that flows through exhaust passage 42 to intake air passage 41 and adjust an amount of exhaust to be recirculated (that is, an EGR recirculation amount). As exhaust (EGR gas) recirculated from exhaust passage 42 to intake air passage 41 is added to suctioned air toward engine main body 13a, a temperature of combustion in engine main body 13a is lowered and generation of NOx resulting from combustion is suppressed.

EGR apparatus 600 includes a recirculation path 610, an EGR cooler 620, and an EGR valve apparatus 630. Recirculation path 610 connects intake air passage 41 and exhaust passage 42 to each other without passing through engine main body 13a. In the embodiment, recirculation path 610 connects a portion of intake air passage 41 upstream from compressor 48 (for example, a portion between compressor 48 and air flow meter 50 in intake air passage 41) and a portion of exhaust passage 42 downstream from turbine 53 (for example, a portion between start catalyst converter 56 and aftertreatment apparatus 57 in exhaust passage 42) to each other.

Recirculation path 610 is provided with EGR cooler 620 and EGR valve apparatus 630. EGR cooler 620 cools EGR gas. For example, a water-cooling or air-cooling heat exchanger is employed as EGR cooler 620.

EGR valve apparatus 630 includes an EGR valve 631 and an EGR actuator 632 that drives EGR valve 631. EGR valve apparatus 630 may include an EGR sensor (not shown) that detects opening of EGR valve 631. EGR valve apparatus 630 may include a not-shown temperature adjustment apparatus (for example, at least one of a heater and a cooler). In the embodiment, a continuously variable valve (for example, a known butterfly valve) is adopted as EGR valve 631. A motor (for example, a direct-current motor) can be adopted as EGR actuator 632. For example, a contactless valve rotation angle sensor including a Hall element can be adopted as the EGR sensor. The temperature adjustment apparatus may adjust a temperature of EGR valve apparatus 630 by making use of cooling water for engine main body 13a. EGR actuator 632 according to the embodiment corresponds to an exemplary "first actuator" according to the present disclosure.

EGR valve 631 can adjust an amount of exhaust recirculated from exhaust passage 42 to intake air passage 41 (that is, the EGR recirculation amount). Fresh air of which flow rate is regulated by throttle valve 49 and EGR gas of which flow rate is regulated by EGR valve 631 flow into compressor 48. Opening of EGR valve 631 (which is also referred to as "EGR opening" below) is in conformity with a cross-sectional area of a passage. When EGR opening is larger than 0%, a flow of EGR gas through recirculation path 610 is permitted. When EGR valve 631 is fully closed (that is, EGR opening is 0%), EGR valve 631 prohibits a flow of EGR gas. EGR opening larger than 0% means that EGR apparatus 600 is on. EGR opening is controlled by HVECU 62 (see FIG. 3) which will be described later.

Figure 3:
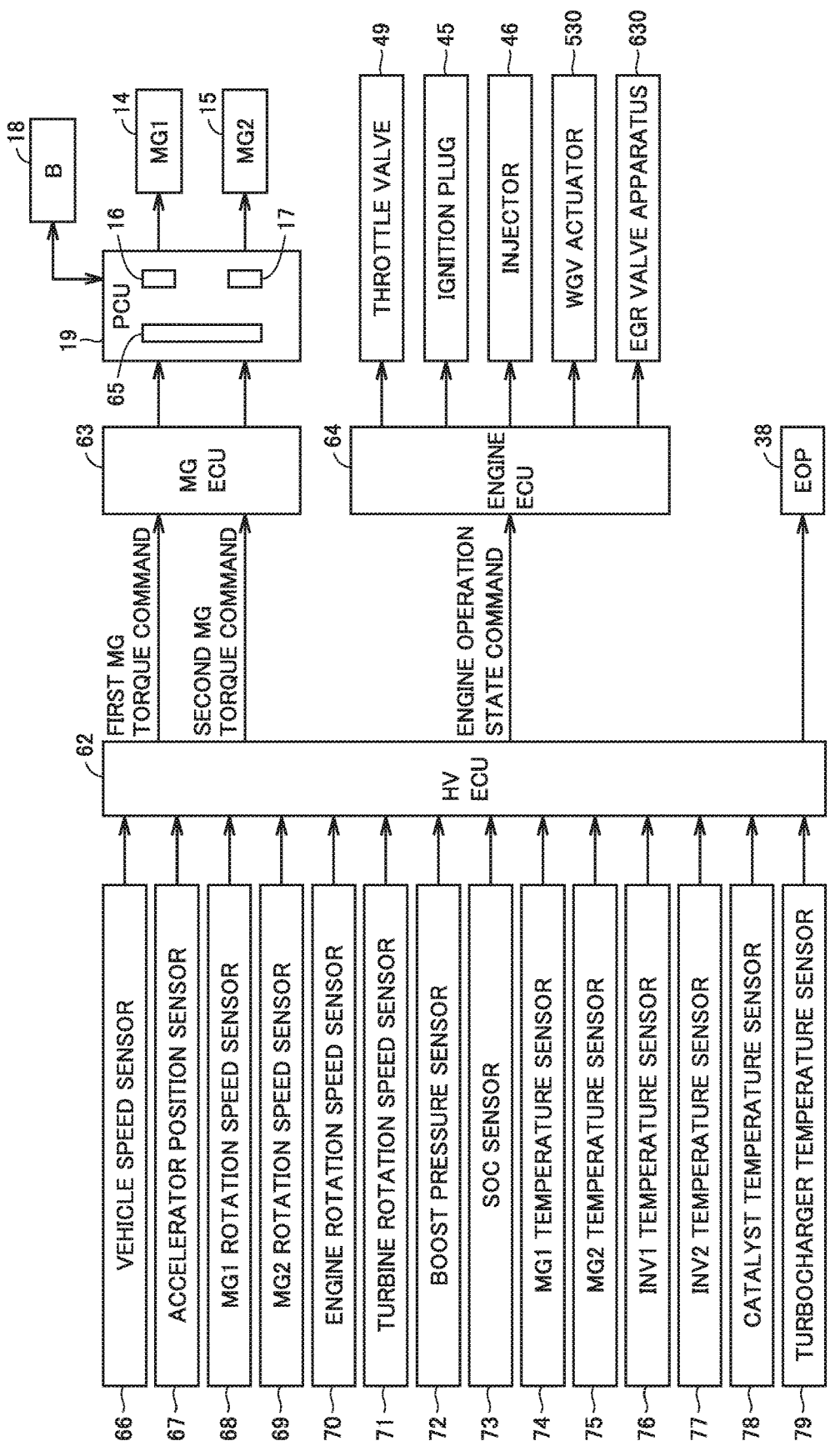
FIG. 3 is a diagram showing a control system of the hybrid vehicle according to the embodiment of the present disclosure.

FIG. 3 is a diagram showing a control system of the hybrid vehicle according to the embodiment. Referring to FIG. 3 together with FIGS. 1 and 2, the control system of the vehicle includes HVECU 62, an MGECU 63, and an engine ECU 64. A vehicle speed sensor 66, an accelerator position sensor 67, an MG1 rotation speed sensor 68, an MG2 rotation speed sensor 69, an engine rotation speed sensor 70, a turbine rotation speed sensor 71, a boost pressure sensor 72, an SOC sensor 73, an MG1 temperature sensor 74, an MG2 temperature sensor 75, an INV1 temperature sensor 76, an INV2 temperature sensor 77, a catalyst temperature sensor 78, and a turbocharger temperature sensor 79 are connected to HVECU 62.

Vehicle speed sensor 66 outputs a signal in accordance with a speed of the vehicle (that is, a traveling speed of the vehicle) to HVECU 62. Accelerator position sensor 67 outputs a signal in accordance with an accelerator position (for example, an amount of pressing of a not-shown accelerator pedal) to HVECU 62. The accelerator position is a parameter that represents an amount of acceleration requested of the vehicle by a driver (which is also referred to as a "requested acceleration amount" below). As a degree of pressing of the accelerator is higher, the requested acceleration amount is larger.

MG1 rotation speed sensor 68 outputs a signal in accordance with a rotation speed of MG 14 to HVECU 62. MG2 rotation speed sensor 69 outputs a signal in accordance with a rotation speed of MG 15 to HVECU 62. Engine rotation speed sensor 70 outputs a signal in accordance with a rotation speed of output shaft 22 of engine 13 to HVECU 62. Turbine rotation speed sensor 71 outputs a signal in accordance with a rotation speed of turbine 53 of turbocharger 47 to HVECU 62. Boost pressure sensor 72 outputs a signal in accordance with a boost pressure of engine 13 to HVECU 62. Boost pressure sensor 72 is provided in an intake manifold in intake air passage 41 as shown, for example, in FIG. 2 and detects a pressure in the intake manifold.

SOC sensor 73 outputs a signal in accordance with a state of charge (SOC) representing a ratio of a remaining charge amount to a full charge amount (that is, a power storage capacity) of battery 18 to HVECU 62. MG1 temperature sensor 74 outputs a signal in accordance with a temperature of MG 14 to HVECU 62. MG2 temperature sensor 75 outputs a signal in accordance with a temperature of MG 15 to HVECU 62. INV1 temperature sensor 76 outputs a signal in accordance with a temperature of first inverter 16 to HVECU 62. INV2 temperature sensor 77 outputs a signal in accordance with a temperature of second inverter 17 to HVECU 62. Catalyst temperature sensor 78 outputs a signal in accordance with a temperature of aftertreatment apparatus 57 to HVECU 62. Turbocharger temperature sensor 79 outputs a signal in accordance with a temperature at a prescribed portion in turbocharger 47 (for example, a temperature of turbine 53) to HVECU 62.

HVECU 62 outputs to engine ECU 64, a command for controlling engine 13. Engine ECU 64 controls throttle valve 49, ignition plug 45, injector 46, WGV actuator 530, and EGR valve apparatus 630 in accordance with a command from HVECU 62. HVECU 62 can control the engine by means of engine ECU 64.

HVECU 62 outputs a command for controlling each of MG 14 and MG 15 to MGECU 63. The vehicle further includes a power control unit (PCU) 19. MGECU 63 controls MG 14 and MG 15 by means of PCU 19. MGECU 63 generates a current signal (for example, a signal representing magnitude and a frequency of a current) corresponding to target torque of each of MG 14 and MG 15 in accordance with a command from HVECU 62 and outputs a generated current signal to PCU 19. HVECU 62 can control the motor by means of MGECU 63.

PCU 19 includes first inverter 16, second inverter 17, and a converter 65. Each of MG 14 and MG 15 is electrically connected to PCU 19. First inverter 16 and converter 65 convert electric power between battery 18 and MG 14. Second inverter 17 and converter 65 convert electric power between battery 18 and MG 15. PCU 19 has electric power stored in battery 18 supplied to each of MG 14 and MG 15, and has electric power generated by each of MG 14 and MG 15 supplied to battery 18. PCU 19 can control states of MGs 14 and 15 separately and for example, it can set MG 14 to a regeneration state (that is, a power generation state) while it can set MG 15 to a power running state. PCU 19 can supply electric power generated by one of MG 14 and MG 15 to the other. MG 14 and MG 15 can supply and receive electric power to and from each other.

The vehicle can travel in an HV traveling mode and an EV traveling mode. Traveling in the HV traveling mode is referred to as "HV traveling" below and traveling in the EV traveling mode is referred to as "EV traveling" below. HV traveling is performed by engine 13 and MG 15. EV traveling is performed by MG 15 with engine 13 being stopped. HVECU 62 selects a suitable traveling mode depending on a situation and the vehicle travels in the selected traveling mode. A driver can switch a shift range of the vehicle by operating a not-shown shift lever. HVECU 62 calculates requested driving force based on a state of the vehicle, and controls engine 13, MG 14, and MG 15 in coordination such that requested driving force is output to drive wheel 24. In HV traveling, torque obtained by combining torque output by engine 13 and torque output by MG 15 serves as traveling driving force. In EV traveling, torque output by MG 15 serves as traveling driving force.

FIG. 4 is a nomographic chart showing exemplary relation among rotation speeds of sun gear S, carrier C, and ring gear R of planetary gear mechanism 20 during HV traveling. Referring to FIG. 4, in exemplary HV traveling, in transmission of torque output from engine 13 (that is, torque input to carrier C) to drive wheel 24, MG 14 applies reaction force to sun gear S of planetary gear mechanism 20. Therefore, sun gear S functions as a reaction force element. In HV traveling, in order to apply torque in accordance with target engine torque based on an acceleration request to drive wheel 24, MG 14 is caused to output reaction torque against target engine torque. MG 14 can perform regenerative electricity generation by using this reaction torque.

FIG. 5 is a nomographic chart showing exemplary relation among rotation speeds of sun gear S, carrier C, and ring gear R of planetary gear mechanism 20 during EV traveling. Referring to FIG. 5, in EV traveling, MG 15 generates traveling driving force with engine 13 being stopped. In EV traveling, HVECU 62 controls ignition plug 45 and injector 46 so as not to allow combustion in engine 13. Since EV traveling is carried out without rotation of engine 13, the rotation speed of carrier C is 0 as shown in FIG. 5.

FIG. 6 is a nomographic chart showing exemplary relation among rotation speeds of sun gear S, carrier C, and ring gear R of planetary gear mechanism 20 while the vehicle is stopped. Referring to FIG. 6, HVECU 62 controls engine 13 and MGs 14 and 15 to set the rotation speed of each of sun gear S, carrier C, and ring gear R to 0, so that traveling of the vehicle is stopped and the vehicle is in a stopped state.

Figure 7:
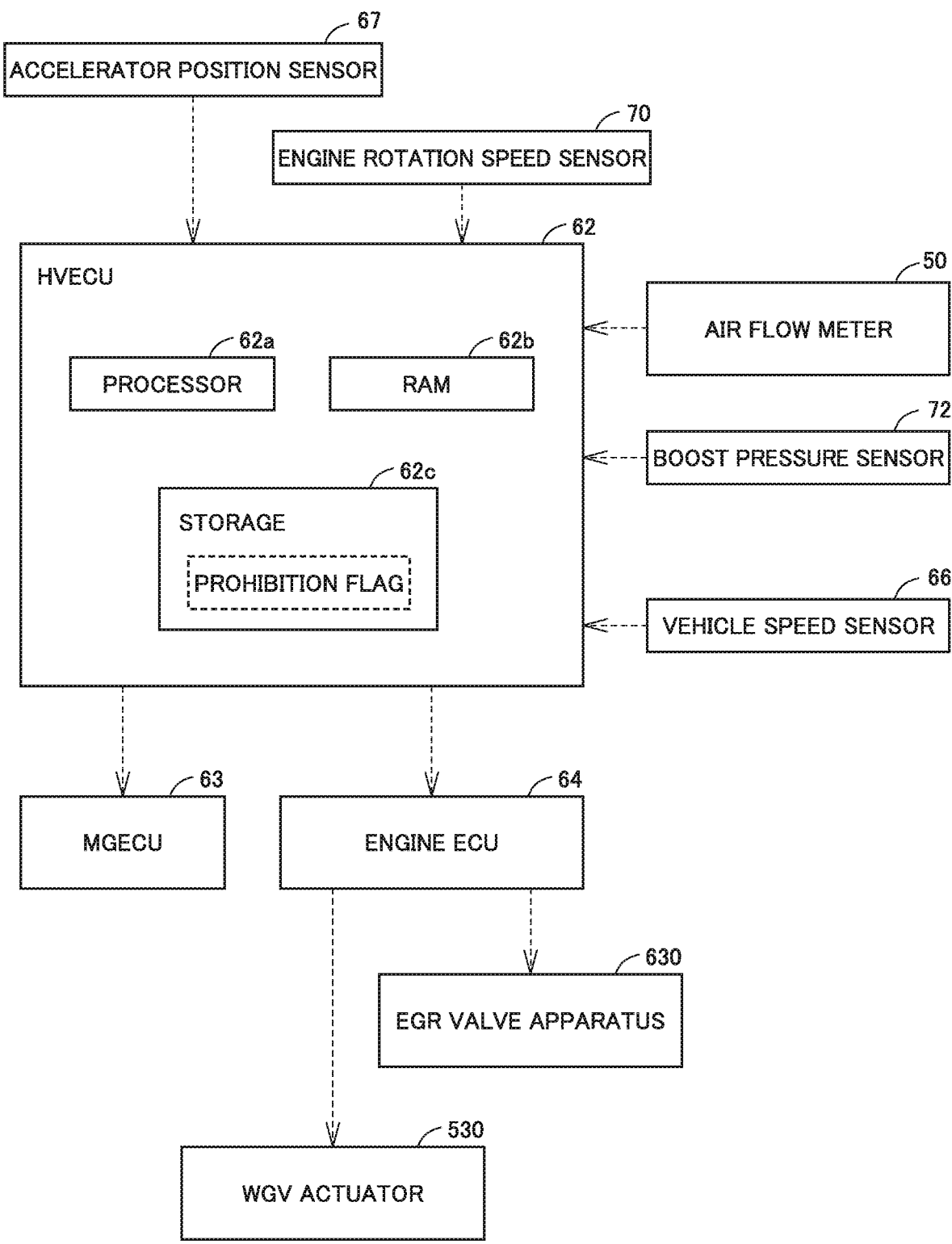
FIG. 7 is a diagram for illustrating a configuration of a controller of the hybrid vehicle according to the embodiment of the present disclosure.

FIG. 7 is a diagram for illustrating a configuration of HVECU 62. Referring to FIG. 7, HVECU 62 includes a processor 62*a*, a random access memory (RAM) 62*b*, and a storage 62*c* as well as input and output ports and a timer that are not shown. For example, a central processing unit (CPU) can be adopted as processor 62*a*. RAM 62*b* functions as a work memory that temporarily stores data to be processed by processor 62*a*. Storage 62*c* is capable of saving information that has been put therein. Storage 62*c* includes, for example, a read only memory (ROM) and a rewritable non-volatile memory. Storage 62*c* stores not only programs but also information used in connection with programs (for example, maps, mathematical expressions, and various parameters). As processor 62*a* executes a program stored in storage 62*c*, various types of control of the vehicle are carried out. Other ECUs (for example, MGECU 63 and engine ECU 64) are also the same in hardware configuration as HVECU 62. Though HVECU 62, MGECU 63, and engine ECU 64 are separately provided in the embodiment, a single ECU may perform functions thereof.

Intake air supplied to engine main body 13*a* (which is also referred to as "suctioned gas" below) is distributed to each cylinder 40 in the intake manifold of intake air passage 41 and suctioned into a combustion chamber in each cylinder 40. When EGR valve 631 is fully closed, suctioned gas consists of fresh air (that is, air taken in from the outside of the vehicle), and when EGR valve 631 is open (that is, when EGR opening is larger than 0%), suctioned gas is composed of mixture gas of fresh air and EGR gas. HVECU 62 can obtain an amount of air (that is, an amount of fresh air) taken in through an air cleaner (not shown) from the outside of the vehicle and supplied to engine main body 13*a* based on a detection value from air flow meter 50. HVECU 62 estimates an amount of suctioned gas and obtains an amount of EGR gas by subtracting an amount of fresh air from the estimated amount of suctioned gas. HVECU 62 can calculate the amount of suctioned gas based on a pressure detected by boost pressure sensor 72, by using correspondence information (which is also referred to as "first correspondence information" below) representing relation between a pressure in the intake manifold and an amount of suctioned gas. A map created through experiments or simulation in advance and stored in storage 62*c* can be adopted as the first correspondence information. HVECU 62 can obtain the EGR ratio (=an amount of EGR gas/an amount of suctioned gas) by dividing the amount of EGR gas by the amount of suctioned gas.

HVECU 62 determines a target EGR ratio based on an operation state (for example, an accelerator position, an engine rotation speed, a vehicle speed, and an engine cooling water temperature) of engine main body 13*a* and carries out feedback control so as to bring the EGR ratio closer to the target EGR ratio. HVECU 62 may refer to correspondence information (which is also referred to as "second correspondence information" below) representing relation between the operation state of engine main body 13*a* and the target EGR ratio in determining the target EGR ratio. A map created through experiments or simulation in advance and stored in storage 62*c* can be adopted as the second correspondence information. HVECU 62 can adjust the EGR recirculation amount (and the EGR ratio) by controlling EGR opening. As EGR opening is larger, the EGR recirculation amount is larger and the EGR ratio is higher.

When the EGR ratio is too high, stability of combustion in engine main body 13*a* is lowered and accidental fire tends to occur. When forced induction is performed with WGV 520 being fully closed while EGR apparatus 600 is on (that is, the recirculated state), more parameters affect the EGR recirculation amount. Therefore, it is difficult to highly accurately control the EGR recirculation amount. For example, a manner of EGR distribution to each cylinder 40 is different between a case that forced induction is performed and a case that forced induction is not performed. When forced induction is performed in the recirculated state, the EGR ratio tends to excessively be high due to lower accuracy in control of the EGR ratio. The inventor of the present application has confirmed through experiments that accidental fire occurs in engine main body 13a at the time of abrupt variation in engine operating point while forced induction is performed with EGR gas remaining in intake air passage 41.

The hybrid vehicle according to the embodiment includes features described below in order to suppress the EGR ratio becoming excessively high.

When opening of EGR valve 631 exceeds prescribed first opening, HVECU 62 maintains opening of WGV 520 at prescribed second opening or larger. HVECU 62 permits closing of WGV 520 to opening smaller than second opening only when EGR valve 631 is fully closed. Storage 62c holds a prohibition flag. HVECU 62 switches between a state that activation of turbocharger 47 is prohibited (prohibition flag=1), a state that activation of EGR apparatus 600 is prohibited (prohibition flag=2), and a state that activation of neither of turbocharger 47 and EGR apparatus 600 is prohibited (prohibition flag=0) by varying a value of the prohibition flag in storage 62c.

When a prescribed first requirement is satisfied while engine 13 is in a prescribed first operation state, HVECU 62 controls EGR valve 631 to be opened to opening larger than first opening with opening of WGV 520 being maintained at second opening or larger, and when a prescribed second requirement is satisfied while engine 13 is in a prescribed second operation state, the HVECU controls WGV 520 to be closed to prescribed turbocharged opening with EGR valve 631 being maintained in the fully closed state. In the embodiment, when opening of WGV 520 is equal to or larger than second opening and a boost pressure of engine 13 is equal to or lower than a prescribed value (which is also denoted as "Th1" below), the first requirement is satisfied. When EGR valve 631 is fully closed and the EGR ratio is equal to or lower than a prescribed value (which is also denoted as "Th2" below), the second requirement is satisfied. A boost pressure low to such an extent that accidental fire is not caused in engine main body 13a even though EGR valve 631 is opened to opening larger than first opening is set as Th1. An EGR ratio low to such an extent that accidental fire is not caused in engine main body 13a even though opening of WGV 520 is set to turbocharged opening is set as Th2. Each of Th1 and Th2 may be fixed or variable depending on a situation.

In the embodiment, the fully closed state (that is, 0%) is defined as first opening. The fully open state (that is, 100%) is defined as second opening and the fully closed state (that is, 0%) is defined as turbocharged opening. Opening of WGV 520 being equal to or larger than second opening means that WGV 520 is fully open.

In the embodiment, a state that torque requested of engine 13 (which is also referred to as "requested engine torque" below) is smaller than a prescribed threshold value (which is also referred to as a "torque threshold value" below) is defined as the first operation state and a state that requested engine torque is larger than the torque threshold value is defined as the second operation state. Therefore, when the first operation state is established, the second operation state is not established, and vice versa. The first operation state and the second operation state cannot simultaneously be established.

Figure 8:
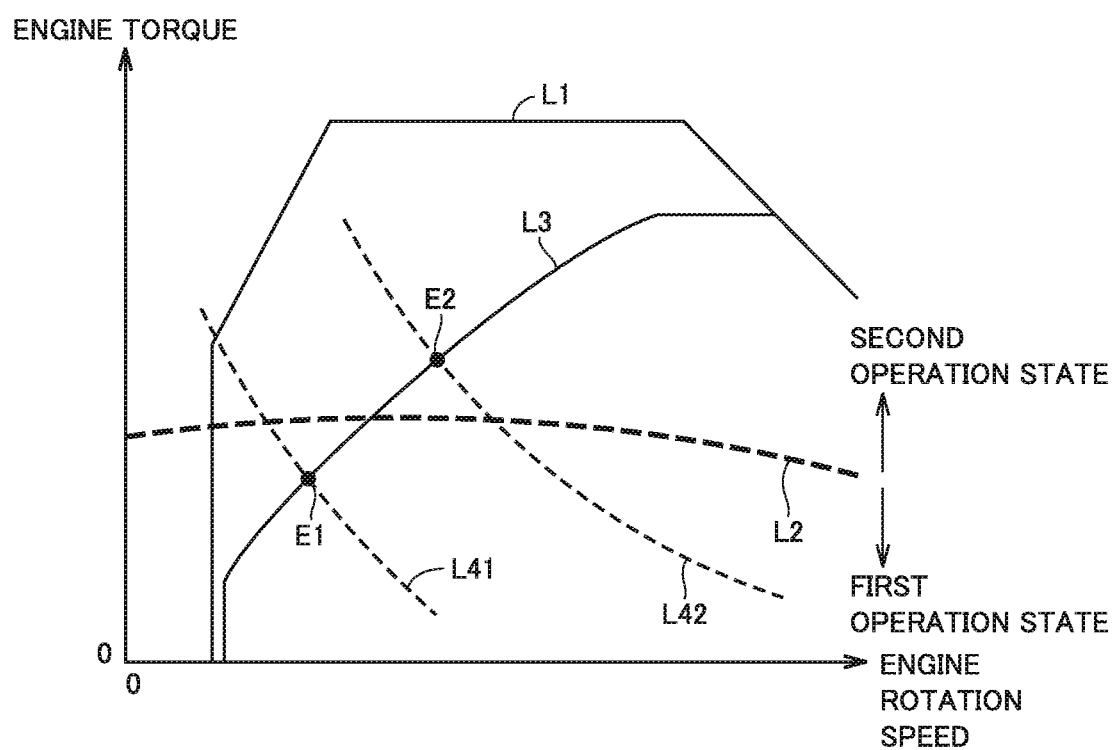
FIG. 8 is a diagram for illustrating a first operation state and a second operation state in a method of engine control of the hybrid vehicle according to the embodiment of the present disclosure.

FIG. 8 is a diagram for illustrating the first operation state and the second operation state in a method of engine control of the hybrid vehicle according to the embodiment. In FIG. 8, operation states of engine 13 are represented by lines L1 to L3 and L41 and L42 drawn on a coordinate plane (which is also referred to as a "Te-Ne coordinate plane" below) of engine torque (the ordinate) and an engine rotation speed (the abscissa). An engine operating point represents an operation state of engine 13 defined by the engine rotation speed and engine torque. Line L1 represents maximum torque that can be output by engine 13. Line L2 represents a boundary between the first operation state and the second operation state (that is, the torque threshold value). Line L3 represents a recommended operating point of engine 13. In the embodiment, the engine operating point on an optimal fuel efficiency line is defined as the recommended operating point. The optimal fuel efficiency line is drawn by connecting engine operating points at which fuel efficiency is highest for each engine power on the Te-Ne coordinate plane. Each of lines L41 and L42 represents an equal power line corresponding to power requested of engine 13 (which is also referred to as "requested engine power" below). Line L41 represents the equal power line corresponding to low requested engine power and line L42 represents the equal power line corresponding to high requested engine power.

Referring to FIG. 8, when line L41 is defined as the equal power line corresponding to requested engine power, HVECU 62 controls engine 13 by means of engine ECU 64 such that the engine operating point is set at an intersection E1 between line L3 and line L41. When line L42 is defined as the equal power line corresponding to requested engine power, HVECU 62 controls engine 13 by means of engine ECU 64 such that the engine operating point is set at an intersection E2 between line L3 and line L42. In the Te-Ne coordinate plane, a region where engine torque is lower than line L2 corresponds to the first operation state and a region where engine torque is higher than line L2 corresponds to the second operation state.

When a prescribed forced induction execution condition is satisfied (for example, when the second requirement is satisfied while engine torque is higher than line L2), HVECU 62 requests of engine ECU 64 to perform forced induction, and when a prescribed forced induction stop condition is satisfied (for example, when engine torque is lower than line L2), HVECU 62 requests of engine ECU 64 to stop forced induction. Engine ECU 64 controls WGV 520 to be opened and closed in accordance with the request from HVECU 62.

In the embodiment, when forced induction is to be performed, HVECU 62 controls WGV 520 to fully be closed, and when forced induction is not to be performed, it controls WGV 520 to fully be opened. For example, when the forced induction execution condition is satisfied while forced induction has been stopped, HVECU 62 requests of engine ECU 64 to perform forced induction (that is, closing of WGV 520). When engine ECU 64 issues an open instruction to negative pressure regulation valve 532 (FIG. 2) of WGV actuator 530 in accordance with the request, negative pressure regulation valve 532 is fully opened and a negative pressure generated by negative pressure pump 533 (FIG. 2) is applied to diaphragm 531. Thus, WGV 520 is fully closed and forced induction is performed. When the forced induction stop condition is satisfied while forced induction is being performed, HVECU 62 requests of engine ECU 64 to stop forced induction (that is, opening of WGV 520). When engine ECU 64 issues a close instruction to negative pressure regulation valve 532 (FIG. 2) of WGV actuator 530 in accordance with the request, negative pressure regulation valve 532 is fully closed and a negative pressure generated by negative pressure pump 533 (FIG. 2) is no longer applied to diaphragm 531. Thus, WGV 520 is fully opened and forced induction is stopped.

Figure 9:
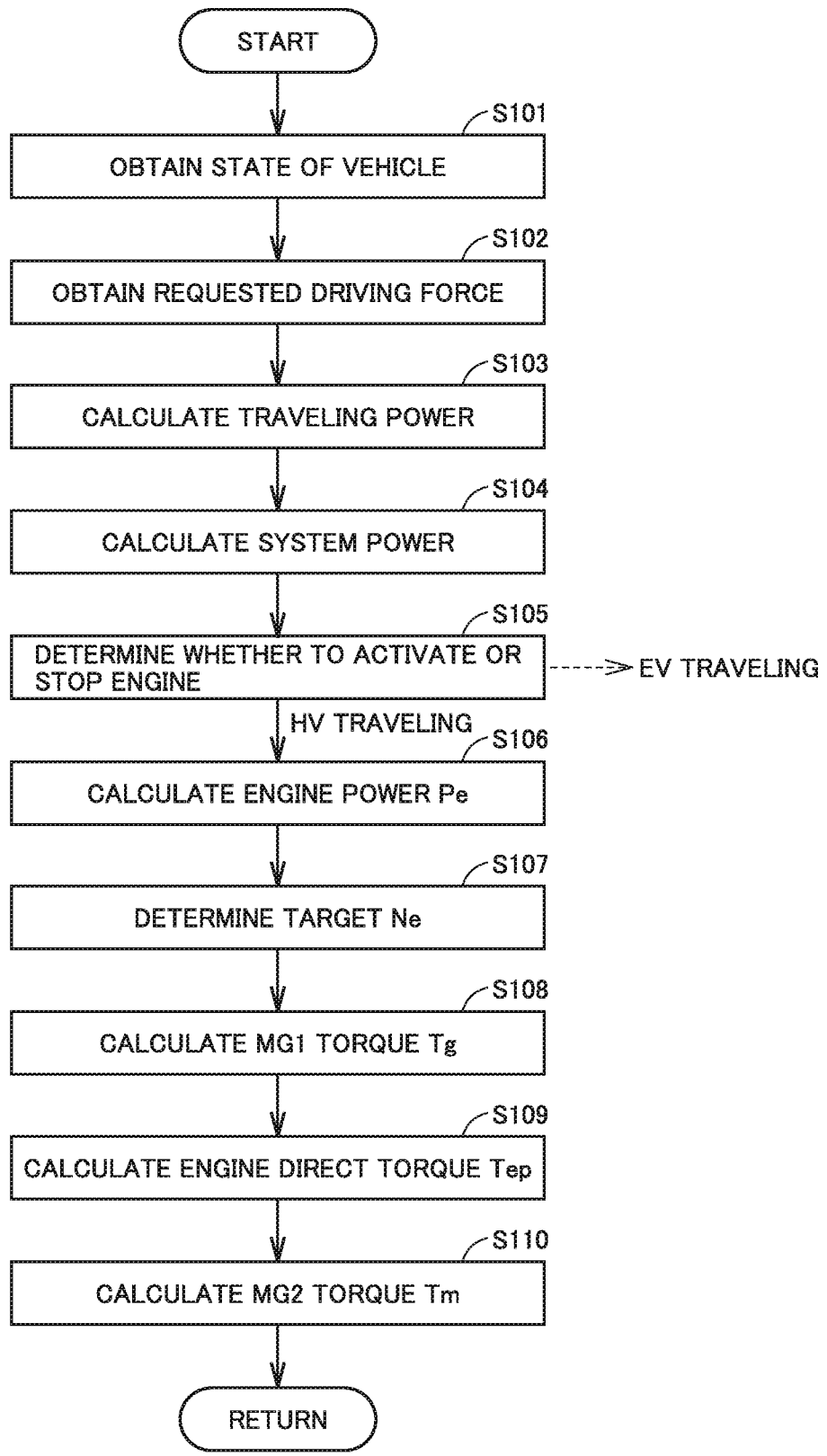
FIG. 9 is a flowchart showing a procedure for determining an engine operating point of the hybrid vehicle according to the embodiment of the present disclosure.

FIG. 9 is a flowchart showing a procedure for determining an engine operating point of the hybrid vehicle according to the embodiment. Processing shown in the flowchart is repeatedly performed as being invoked from a main routine (not shown) every prescribed period.

Referring to FIG. 9 together with FIGS. 1 to 3, HVECU 62 obtains information representing a state of the vehicle (for example, an accelerator position, a selected shift range, and a vehicle speed) in a step (which is also simply denoted as "S" below) 101. In succession, HVECU 62 obtains requested driving force corresponding to the state of the vehicle in S102. HVECU 62 may refer to correspondence information representing relation between the state of the vehicle and requested driving force (which is also referred to as "third correspondence information" below) in obtaining requested driving force. A map showing relation between an accelerator position and a vehicle speed prepared in advance for each shift range may be adopted as the third correspondence information.

In S103, HVECU 62 calculates traveling power of the vehicle by multiplying requested driving force obtained in S102 by the vehicle speed and adding prescribed lost power thereto. In S104, HVECU 62 determines an amount of charging and discharging to be requested of battery 18 (which is also referred to as a "requested charging and discharging amount" below) and calculates system power of the vehicle by adding the requested charging and discharging amount (a charging side being defined as a positive value) to traveling power calculated in S103. HVECU 62 can increase the requested charging and discharging amount toward the positive side as an SOC of battery 18 is lower and can set a negative requested charging and discharging amount when the SOC of battery 18 is high.

In S105, HVECU 62 determines whether to activate or stop engine 13 based on traveling power and system power calculated as above. For example, when traveling power is higher than a prescribed value (which is also denoted as "Th3" below), HVECU 62 determines that engine 13 is to be activated. When system power is higher than a prescribed value (which is also denoted as "Th4" below) as well, HVECU 62 determines that engine 13 is to be activated. When traveling power is equal to or lower than Th3 and system power is equal to or lower than Th4, HVECU 62 determines that engine 13 is to be stopped.

When HVECU 62 determines that engine 13 is to be activated, the traveling mode of the vehicle is set to the HV traveling mode. In the HV traveling mode, processing in S106 and later is performed. Through the processing in S106 and later, engine 13 is activated for travel of the vehicle and/or power generation. When HVECU 62 determines that engine 13 is to be stopped, the traveling mode of the vehicle is set to the EV traveling mode. In the EV traveling mode, not-shown motor torque calculation processing is performed and torque of MG 15 is calculated based on requested driving force.

In S106, HVECU 62 calculates power of engine 13 (which is also denoted as "Pe" below) based on system power calculated in S104. HVECU 62 can obtain Pe by performing prescribed operation processing (for example, correction and restriction) on system power. Pe corresponds to an engine operation state command to engine 13 and it is transmitted from HVECU 62 to engine ECU 64.

In S107, HVECU 62 determines a target engine rotation speed (which is also denoted as a "target Ne" below) based on Pe calculated in S106. In the embodiment, HVECU 62 determines an intersection (that is, a recommended operating point) between the equal power line corresponding to Pe and line L3 (for example, the optimal fuel efficiency line) shown in FIG. 8 on the Te-Ne coordinate plane as the target operating point. Then, HVECU 62 determines the engine rotation speed at the target operating point as target Ne. HVECU 62 determines engine torque at the target operating point as target engine torque (which is also denoted as "target Te" below). HVECU 62 may refer to correspondence information (which is also referred to as "fourth correspondence information" below) representing relation between Pe and target Ne in determining target Ne. A map showing relation between Pe and an engine rotation speed (that is, target Ne) at a recommended operating point corresponding to Pe may be adopted as the fourth correspondence information.

In S108, HVECU 62 calculates torque (which is also denoted as "Tg" below) of MG 14 based on target Ne. Torque (that is, Tg) to be generated by MG 14 is calculated such that the operating point of engine 13 attains to the target operating point. HVECU 62 can calculate Tg based on target Ne, for example, in accordance with a mathematical expression including a planetary gear ratio of planetary gear mechanism 20 (FIG. 1). Tg corresponds to a torque command for MG 14 and is transmitted from HVECU 62 to MGECU 63.

In S109, HVECU 62 calculates engine direct torque (which is also denoted as "Tep" below) based on Tg. Tep corresponds to torque to be output from planetary gear mechanism 20 (FIG. 1). When engine torque is input to carrier C of planetary gear mechanism 20, engine direct torque (Tep) is output from ring gear R of planetary gear mechanism 20. HVECU 62 can calculate Tep based on Tg, for example, in accordance with a mathematical expression including a planetary gear ratio of planetary gear mechanism 20.

In S110, HVECU 62 calculates torque (which is also denoted as "Tm" below) of MG 15 based on requested driving force obtained in S102 and Tep calculated in S109. Torque (that is, Tm) to be generated by MG 15 is calculated such that requested driving force is output to drive wheel 24 (FIG. 1). HVECU 62 calculates Tm, for example, by subtracting Tep from requested driving force. Tm corresponds to a torque command for MG 15 and is transmitted from HVECU 62 to MGECU 63.

EGR control and forced induction control will be described below with reference to FIGS. 10 to 12. EGR control shown in FIG. 10 and forced induction control shown in FIG. 11 are carried out in parallel and a value of the prohibition flag (FIG. 7) in storage 62c is varied in each control. A series of processing shown in each of FIGS. 10 and 11 is repeatedly performed as being invoked from a main routine (not shown).

Figure 10:
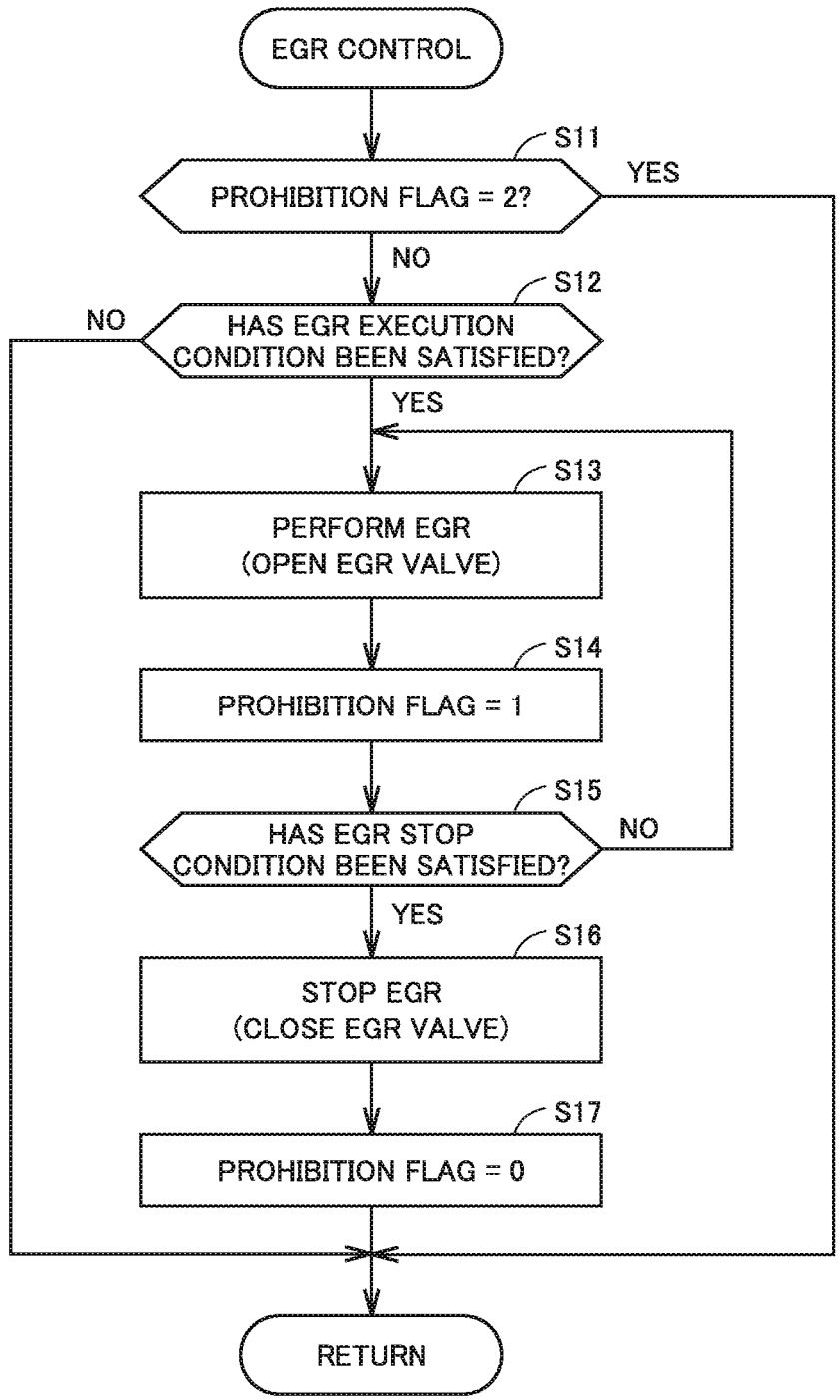
FIG. 10 is a flowchart showing a procedure in processing for EGR control performed by the controller of the hybrid vehicle according to the embodiment of the present disclosure.
Figure 11:
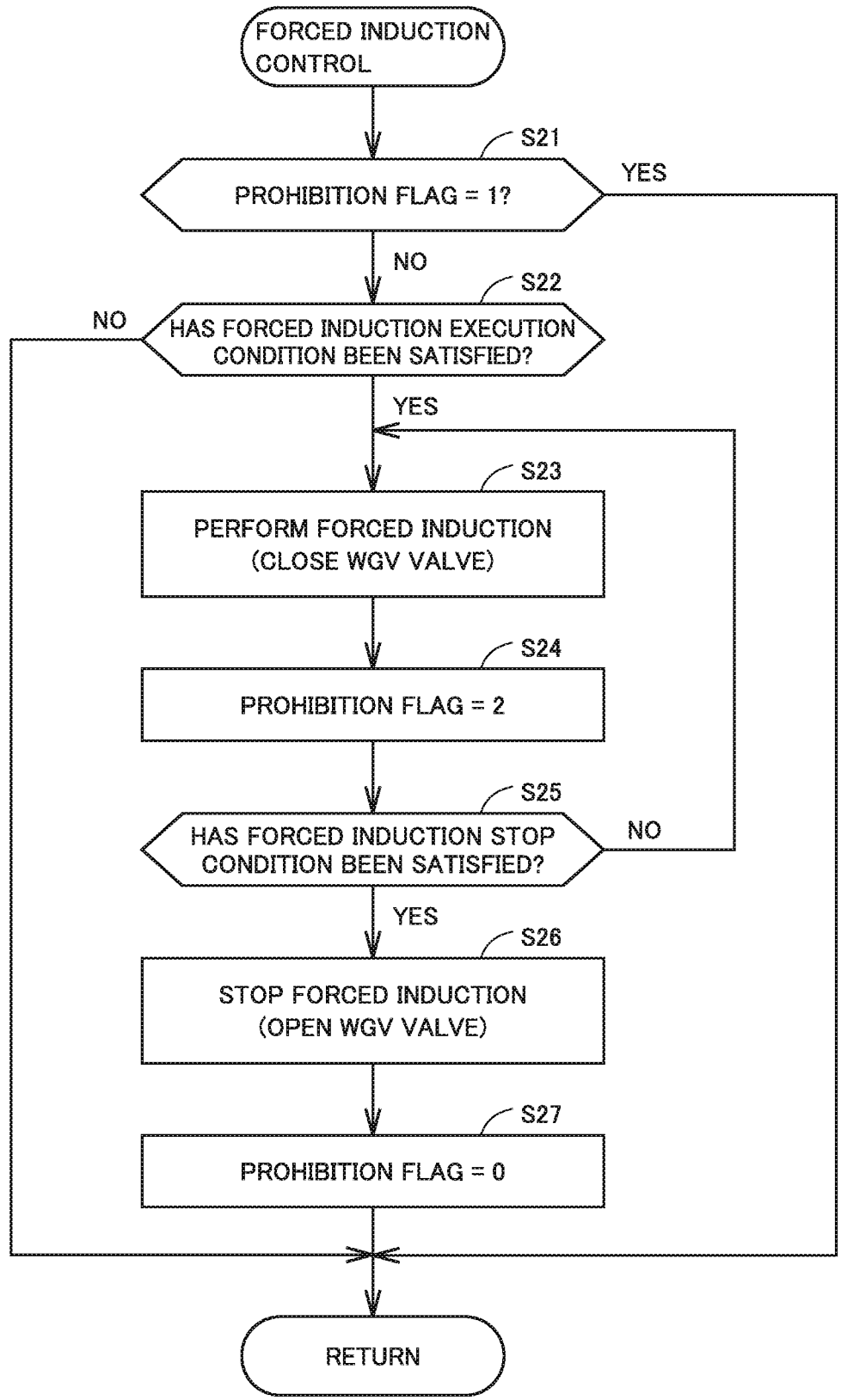
FIG. 11 is a flowchart showing a procedure in processing for forced induction control performed by the controller of the hybrid vehicle according to the embodiment of the present disclosure.

FIG. 10 is a flowchart showing a procedure in processing for EGR control performed by HVECU 62.

Referring to FIG. 10 together with FIGS. 1 to 3 and 7, in S11, HVECU 62 determines whether or not the prohibition flag in storage 62c has been set to 2. When the prohibition flag has not been set to 2 (NO in S11), HVECU 62 determines in S12 whether or not a prescribed EGR execution condition has been satisfied. When the prohibition flag has been set to 2 (YES in S11) and when the EGR execution condition has not been satisfied (NO in S12), the process returns to the main routine without recirculation of exhaust by EGR apparatus 600.

In the embodiment, when requirements necessary for satisfying the condition (which are also referred to as "EGR necessary requirements" below) are all satisfied, the EGR execution condition (S12) is satisfied. In the embodiment, requirements (A-1) to (A-3) shown below are defined as the EGR necessary requirements.

(A-1) Engine 13 is in the first operation state (for example, target Te is lower than line L2 shown in FIG. 8).

(A-2) WGV 520 is fully opened.

(A-3) A boost pressure (for example, a pressure detected by boost pressure sensor 72) of engine 13 is equal to or lower than Th1.

Requirements (A-2) and (A-3) correspond to the "first requirement" described previously. In the embodiment, when WGV 520 is closed, the prohibition flag is set to 2 (see S24 in FIG. 11 which will be described later). Therefore, when the prohibition flag has not been set to 2 (NO in S11), the requirement (A-2) is always satisfied.

When at least one of the requirements (A-1) to (A-3) is not satisfied, it is determined in S12 that the EGR execution condition is not satisfied (NO). When all of the requirements (A-1) to (A-3) are satisfied, it is determined in S12 that the EGR execution condition is satisfied (YES) and the process proceeds to S13.

In S13, HVECU 62 controls EGR valve 631 to be opened and carries out feedback control described previously. Specifically, HVECU 62 controls opening of EGR valve 631 to bring the EGR ratio closer to the target EGR ratio. In S14, HVECU 62 sets the prohibition flag in storage 62c to 1. Activation of turbocharger 47 (and closing of WGV 520) is thus prohibited (see S21 in FIG. 11 which will be described later).

After processing in S14, HVECU 62 determines in S15 whether or not a prescribed EGR stop condition has been satisfied. In the embodiment, when target Te is equal to or larger than the torque threshold value (line L2) shown in FIG. 8, the EGR stop condition is satisfied. As S13 to S15 are repeatedly performed for a period until the EGR stop condition is satisfied (that is, a period for which determination as NO is made in S15), feedback control of the EGR ratio is continued with WGV 520 being maintained in the fully opened state.

When the EGR stop condition has been satisfied (YES in S15), HVECU 62 issues a command to fully close the EGR valve to EGR actuator 632 in S16 so that EGR valve 631 is fully closed. EGR apparatus 600 thus makes transition from the activated state to the stopped state. In succession, HVECU 62 sets the prohibition flag in storage 62c to 0 in S17. Prohibition of activation (S14) of turbocharger 47 is thus canceled. Thereafter, the process returns to the main routine.

FIG. 11 is a flowchart showing a procedure in processing for forced induction control performed by HVECU 62.

Referring to FIG. 11 together with FIGS. 1 to 3 and 7, HVECU 62 determines in S21 whether or not the prohibition flag in storage 62c has been set to 1. When the prohibition flag has not been set to 1 (NO in S21), HVECU 62 determines in S22 whether or not a prescribed forced induction execution condition has been satisfied. When the prohibition flag has been set to 1 (YES in S21) and when the EGR execution condition has not been satisfied (NO in S22), the process returns to the main routine without forced induction by turbocharger 47.

In the embodiment, when all requirements necessary for satisfying the condition (which are also referred to as "forced induction necessary requirements" below) are satisfied, the forced induction execution condition (S22) is satisfied. In the embodiment, requirements (B-1) to (B-3) shown below are defined as the forced induction necessary requirements.

(B-1) Engine 13 is in the second operation state (for example, target Te is higher than line L2 shown in FIG. 8).

(B-2) EGR valve 631 is fully closed.

(B-3) The EGR ratio is equal to or lower than Th2.

The requirements (B-2) and (B-3) correspond to the "second requirement" described previously. In the embodiment, when EGR valve 631 is open, the prohibition flag is set to 1 (see S14 in FIG. 10). Therefore, when the prohibition flag has not been set to 1 (NO in S21), the requirement (B-2) is always satisfied.

When at least one of the requirements (B-1) to (B-3) is not satisfied, it is determined in S22 that the forced induction execution condition is not satisfied (NO). When all of the requirements (B-1) to (B-3) are satisfied, it is determined in S22 that the forced induction execution condition is satisfied (YES) and the process proceeds to S23.

In S23, HVECU 62 controls WGV 520 to fully be closed. In S24, HVECU 62 sets the prohibition flag in storage 62c to 2. Activation of EGR apparatus 600 (and opening of EGR valve 631) is thus prohibited (see S11 in FIG. 10).

After processing in S24, HVECU 62 determines in S25 whether or not the prescribed forced induction stop condition has been satisfied. In the embodiment, when target Te is lower than the torque threshold value (line L2) shown in FIG. 8, the forced induction stop condition is satisfied. For a period until the forced induction stop condition is satisfied (that is, a period for which determination as NO is made in S25), EGR valve 631 is maintained in the fully closed state and forced induction by turbocharger 47 is continued by repetition of S23 to S25.

When the forced induction stop condition has been satisfied (YES in S25), HVECU 62 issues a command to fully open the WGV to WGV actuator 530 in S26 so that WGV 520 is fully opened. Turbocharger 47 thus makes transition from the activated state to the stopped state. In succession, HVECU 62 sets the prohibition flag in storage 62c to 0 in S27. Prohibition of activation (S24) of EGR apparatus 600 is thus canceled. Thereafter, the process returns to the main routine.

Figure 12:
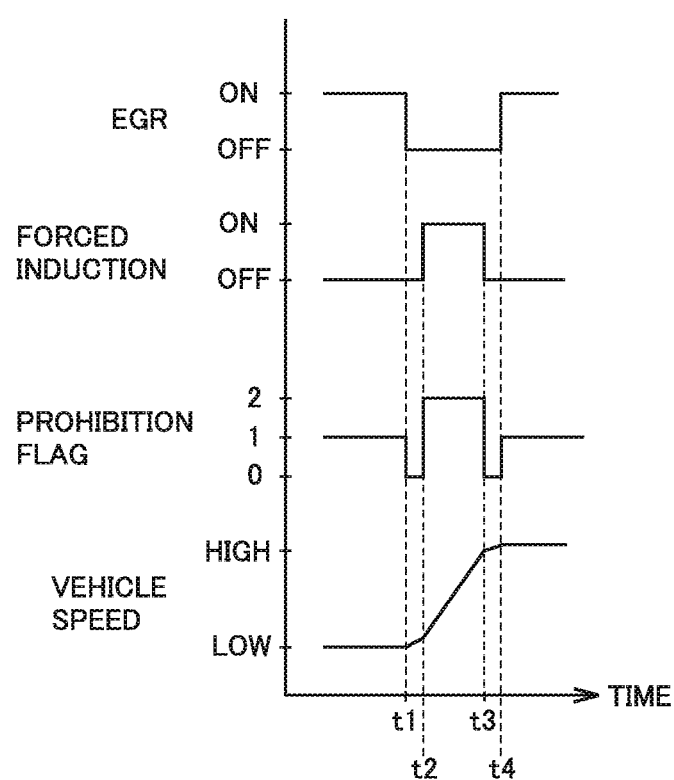
FIG. 12 is a diagram for illustrating an operation by the hybrid vehicle according to the embodiment of the present disclosure.

FIG. 12 is a diagram for illustrating an operation by the hybrid vehicle according to the embodiment. In an exemplary operation in FIG. 12, EGR apparatus 600 and turbocharger 47 are controlled as will be described below in acceleration of the vehicle.

Referring to FIG. 12, before timing t1, the vehicle travels at a low speed. EGR apparatus 600 has been turned on (ON) and turbocharger 47 has been turned off (OFF). During this period, the prohibition flag has been set to 1 in the processing in S14 in FIG. 10.

When target Te increases in response to a request for acceleration from a driver and the EGR stop condition is satisfied at timing t1 (YES in S15 in FIG. 10), EGR apparatus 600 is turned off (OFF) (S16 in FIG. 10). The prohibition flag is then set to 0 in the processing in S17 in FIG. 10.

When the EGR ratio is thereafter lowered and the forced induction execution condition is satisfied at timing t2 (YES in S22 in FIG. 11), turbocharger 47 is activated (ON) (S23 in FIG. 11). The prohibition flag is then set to 2 in the processing in S24 in FIG. 11.

When target Te is lowered and the forced induction stop condition is satisfied at timing t3 (YES in S25 in FIG. 11), turbocharger 47 is turned off (OFF) (S26 in FIG. 11). The prohibition flag is then set to 0 in the processing in S27 in FIG. 11.

When the boost pressure of engine 13 is thereafter lowered and the EGR execution condition is satisfied at timing t4 (YES in S12 in FIG. 10), EGR apparatus 600 is activated (ON) (S13 in FIG. 10). The prohibition flag is then set to 1 in the processing in S14 in FIG. 10.

In the hybrid vehicle according to the embodiment, each of engine 13 and MG 14 is mechanically coupled to drive wheel 24 with planetary gear mechanism 20 (planetary gear) being interposed (see FIG. 1). Planetary gear mechanism 20 and MG 15 are configured such that motive power output from planetary gear mechanism 20 and motive power output from MG 15 are transmitted to drive wheel 24 as being combined (see FIG. 1). Then, when EGR valve 631 is open (that is, when opening of EGR valve 631 exceeds 0%), HVECU 62 maintains WGV 520 in the fully opened state. HVECU 62 prevents forced induction from being performed by maintaining WGV 520 in the fully opened state when the EGR ratio may excessively be high (that is, when EGR valve 631 is open). Thus, the EGR ratio becoming excessively high is suppressed and accidental fire in engine main body 13a is less likely. When WGV 520 is maintained in the fully opened state to lower engine power and traveling power is consequently insufficient, HVECU 62 can control MG 15 to compensate for insufficient traveling power. Therefore, even though WGV 520 is maintained in the fully opened state to prevent forced induction from being performed, deterioration in traveling performance resulting from insufficiency in power is less likely. Thus, according to the configuration, the hybrid vehicle incorporating engine 13 including both of EGR apparatus 600 and turbocharger 47 can appropriately be operated.

HVECU 62 of the hybrid vehicle according to the embodiment performs a method of engine control of a hybrid vehicle including steps A to F described below.

In step A, HVECU 62 determines whether or not both of a condition that opening of EGR valve 631 is not prohibited and a condition that a prescribed EGR execution condition is satisfied are satisfied (S11 and S12 in FIG. 10).

In step B, when HVECU 62 determines that opening of EGR valve 631 is not prohibited and that the EGR execution condition is satisfied (NO in S11 and YES in S12 in FIG. 10), HVECU 62 carries out feedback control of the EGR ratio by controlling EGR valve 631 to be opened with WGV 520 being maintained in the fully opened state (S13 in FIG. 10) and prohibits closing of WGV 520 (S14 in FIG. 10).

In step C, when the EGR stop condition is satisfied while feedback control of the EGR ratio is carried out (that is, when EGR valve 631 is open) (YES in S15 in FIG. 10), HVECU 62 controls EGR valve 631 to fully be closed (S16 in FIG. 10) and cancels prohibition of closing of WGV 520 (S17 in FIG. 10).

In step D, HVECU 62 determines whether or not both of a condition that closing of WGV 520 is not prohibited and a condition that the forced induction execution condition is satisfied are satisfied (S21 and S22 in FIG. 11).

In step E, when HVECU 62 determines that closing of WGV 520 is not prohibited and that the forced induction execution condition is satisfied (NO in S21 and YES in S22 in FIG. 11), HVECU 62 performs forced induction by controlling WGV 520 to fully be closed while maintaining EGR valve 631 in the fully closed state (S23 in FIG. 11) and prohibits opening of EGR valve 631 (S24 in FIG. 11).

In step F, when the prescribed forced induction stop condition is satisfied while forced induction is being performed (that is, WGV 520 is fully closed), HVECU 62 controls WGV 520 to fully be opened (S26 in FIG. 11) and cancels prohibition of opening of EGR valve 631 (S27 in FIG. 11).

In the method, when EGR valve 631 is open, closing of WGV 520 is prohibited and WGV 520 is maintained in the fully opened state. When WGV 520 is closed, opening of EGR valve 631 is prohibited and EGR valve 631 is maintained in the fully closed state. The EGR ratio becoming excessively high is thus suppressed and accidental fire in engine main body 13a is less likely. According to the method, the hybrid vehicle incorporating engine 13 including both of EGR apparatus 600 and turbocharger 47 can appropriately be operated.

In the embodiment, the first operation state and the second operation state are distinguished from each other based on magnitude of engine torque. The first operation state and the second operation state, however, may be distinguished from each other based on the engine rotation speed instead of or in addition to engine torque.

Each of the EGR execution condition, the EGR stop condition, the forced induction execution condition, and the forced induction stop condition shown in the embodiment is merely by way of example, and such a condition can be modified as appropriate. For example, a requirement (A-4) below instead of or in addition to the requirement (A-3) may be adopted for the EGR execution condition, and a requirement (B-4) below instead of or in addition to the requirement (B-3) may be adopted for the forced induction execution condition.

(A-4) A prescribed first time period has elapsed since HVECU 62 issued a command to fully open the WGV to WGV actuator 530 in S26 in FIG. 11.

(B-4) A prescribed second time period has elapsed since HVECU 62 issued a command to fully close the EGR valve to EGR actuator 632 in S16 in FIG. 10.

A time period long to such an extent that accidental fire is not caused in engine main body 13a even though EGR valve 631 is opened to opening larger than first opening is set as the first time period. A time period long to such an extent that accidental fire is not caused in engine main body 13a even though opening of WGV 520 is set to turbocharged opening is set as the second time period.

Each of the EGR execution condition, the EGR stop condition, the forced induction execution condition, and the forced induction stop condition may be fixed or variable depending on a situation. At least one of these conditions may be modified by a user.

The configuration of engine 13 is not limited to the configuration shown in FIG. 2 and can be modified as appropriate. For example, throttle valve 49 may be provided between air flow meter 50 and compressor 48 in intake air passage 41. Recirculation path 610 may connect a portion of intake air passage 41 downstream from compressor 48 and a portion of exhaust passage 42 upstream from turbine 53 to each other. A layout of the cylinders is not limited to the in-line layout either, and may be a V layout or a horizontal layout. The number of cylinders and valves can also arbitrarily be modified.

In the embodiment, binary control such as on and off of forced induction (that is, a high boost pressure and a low boost pressure) is carried out. HVECU 62, however, may regulate a boost pressure to desired magnitude by continuously controlling the position (that is, opening) of WGV 520 within a range from a fully closed state to a fully opened state. A continuously variable valve may be adopted as negative pressure regulation valve 532 so that magnitude of a negative pressure to be applied to diaphragm 531 can continuously be regulated. In the configuration shown in FIG. 2, negative pressure regulation valve 532 does not have to be provided and an electric pump may be adopted as negative pressure pump 533. HVECU 62 may regulate magnitude of a negative pressure to be applied to diaphragm 531 by controlling an amount of drive of the electric pump. WGV 520 may be a normally closed valve. A scheme for driving WGV 520 is not limited to a negative pressure but any scheme or an electric scheme is applicable. A scheme for driving EGR valve 631 is not limited to the electric scheme either but any scheme is applicable.

When opening of EGR valve 631 exceeds prescribed first opening, HVECU 62 maintains opening of WGV 520 at prescribed second opening or larger. When the forced induction execution condition is satisfied while the prohibition flag has not been set to 1, HVECU 62 sets opening of WGV 520 to turbocharged opening. Though the fully closed state is defined as first opening, the fully opened state is defined as second opening, and the fully closed state is defined as turbocharged opening in the embodiment, each of first opening, second opening, and turbocharged opening can arbitrarily be set. For example, first opening may be set to opening larger than the fully closed state and smaller than 15%. Second opening may be set to opening larger than 85% and smaller than the fully opened state. Turbocharged opening may be set to opening larger than the fully closed state and smaller than 15%.

A gasoline engine is adopted as engine 13 in the embodiment. Without being limited as such, any internal combustion engine can be adopted as engine 13 and a diesel engine can also be adopted.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
a drive wheel;
an engine, a first motor generator, and a second motor generator mechanically coupled to the drive wheel; and
a controller configured to control the engine, the first motor generator, and the second motor generator,
the engine including
an engine main body where combustion is performed,
an intake air passage and an exhaust passage connected to the engine main body,
a recirculation path that connects the intake air passage and the exhaust passage to each other without passing through the engine main body,
an EGR valve provided in the recirculation path,
a turbocharger,
a bypass path connected to the exhaust passage, and
a waste gate valve provided in the bypass path,
the EGR valve being configured to adjust an amount of exhaust recirculated from the exhaust passage to the intake air passage,
the turbocharger including
a compressor provided in the intake air passage, and
a turbine provided in the exhaust passage, the compressor and the turbine being rotated together,
the bypass path allowing exhaust to flow as bypassing the turbine,
each of the engine and the first motor generator being mechanically coupled to the drive wheel with a planetary gear being interposed,
the planetary gear and the second motor generator being configured such that motive power output from the planetary gear and motive power output from the second motor generator are transmitted to the drive wheel as being combined, wherein
the controller is configured to carry out feedback control so as to bring an EGR ratio closer to a target EGR ratio based on an operation state of the engine main body, the EGR ratio representing a ratio occupied by recirculated exhaust in intake air supplied to the engine main body,
the controller is configured to determine whether a forced induction execution condition is satisfied, the forced induction execution condition including a condition that opening of the EGR valve does not exceed a first opening,
when the forced induction execution condition is satisfied, the controller is configured to prohibit opening of the EGR valve and control the waste gate valve to perform forced induction by the turbocharger,
the controller is configured to determine whether an EGR execution condition is satisfied, the EGR execution condition including a condition that opening of the waste gate valve is equal to or larger than a second opening, and
when the EGR execution condition is satisfied, the controller is configured to prohibit closing of the waste gate valve and carry out the feedback control,
the controller is configured to determine whether an EGR stop condition is satisfied while the feedback control is carried out,
when the EGR stop condition is satisfied, the controller is configured to control the EGR valve to fully be closed and cancels prohibition of closing of the waste gate valve,
the controller is configured to determine whether a forced induction stop condition is satisfied while the forced induction by the turbocharger is being performed, and
when the forced induction stop condition is satisfied, the controller is configured to control the waste gate valve to fully be opened and cancels prohibition of opening of the EGR valve.

2. The hybrid vehicle according to claim 1, wherein
when the forced induction execution condition is satisfied, the controller is configured to control the waste gate valve to fully be closed, and
the forced induction execution condition includes a condition that the EGR valve is fully closed.

3. The hybrid vehicle according to claim 1, wherein
a fully closed state is defined as the first opening and a fully opened state is defined as the second opening.

4. The hybrid vehicle according to claim 1, wherein
the controller includes a storage that stores a flag, and
the controller is configured to store the flag to any one of a first value requesting a state that activation of the turbocharger is prohibited, a second value requesting a state that activation of the EGR valve is prohibited, and a third value requesting a state that activation of neither of the turbocharger and the EGR valve is prohibited.

5. The hybrid vehicle according to claim 4, wherein
when the EGR execution condition is satisfied, the controller is configured to set the flag to the first value, when the forced induction execution condition is satisfied, the controller is configured to set the flag to the second value, the controller is configured to determine whether an EGR stop condition is satisfied while the feedback control is carried out, when the EGR stop condition is satisfied, the controller is configured to set the flag to the third value, the controller is configured to determine whether a forced induction stop condition is satisfied while the forced induction by the turbocharger is being performed, and when the forced induction stop condition is satisfied, the controller is configured to set the flag to the third value.

6. The hybrid vehicle according to claim 1, wherein opening larger than a fully closed state and smaller than 15% is defined as the first opening and opening larger than 85% and smaller than a fully opened state is defined as the second opening.

7. A hybrid vehicle comprising:
a drive wheel;
an engine, a first motor generator, and a second motor generator mechanically coupled to the drive wheel; and
a controller configured to control the engine, the first motor generator, and the second motor generator,
the engine including
an engine main body where combustion is performed,
an intake air passage and an exhaust passage connected to the engine main body,
a recirculation path that connects the intake air passage and the exhaust passage to each other without passing through the engine main body,
an EGR valve provided in the recirculation path,
a turbocharger,
a bypass path connected to the exhaust passage, and
a waste gate valve provided in the bypass path,
the EGR valve being configured to adjust an amount of exhaust recirculated from the exhaust passage to the intake air passage,
the turbocharger including
a compressor provided in the intake air passage, and
a turbine provided in the exhaust passage, the compressor and the turbine being rotated together,
the bypass path allowing exhaust to flow as bypassing the turbine,
each of the engine and the first motor generator being mechanically coupled to the drive wheel with a planetary gear being interposed,
the planetary gear and the second motor generator being configured such that motive power output from the planetary gear and motive power output from the second motor generator are transmitted to the drive wheel as being combined, wherein
the controller is configured to carry out feedback control so as to bring an EGR ratio closer to a target EGR ratio based on an operation state of the engine main body, the EGR ratio representing a ratio occupied by recirculated exhaust in intake air supplied to the engine main body,
the controller is configured to determine whether a forced induction execution condition is satisfied, the forced induction execution condition including a condition that opening of the EGR valve does not exceed a first opening, when the forced induction execution condition is satisfied, the controller is configured to prohibit opening of the EGR valve and control the waste gate valve to perform forced induction by the turbocharger, the controller is configured to determine whether an EGR execution condition is satisfied, the EGR execution condition including a condition that opening of the waste gate valve is equal to or larger than a second opening, and when the EGR execution condition is satisfied, the controller is configured to prohibit closing of the waste gate valve and carry out the feedback control, when the EGR execution condition is satisfied is configured to control the EGR valve to be opened to an opening larger than the first opening with opening of the waste gate valve being maintained at the second opening or larger, when the EGR execution condition is not satisfied, the controller is configured to maintain the EGR valve in a fully closed state, when the forced induction execution condition is satisfied, the controller is configured to control the waste gate valve to be closed to a prescribed opening smaller than the second opening with the EGR valve being maintained in a fully closed state, and when the forced induction execution condition is not satisfied, the controller is configured to maintain the waste gate valve in a fully opened state.

8. The hybrid vehicle according to claim 7, wherein
the EGR execution condition includes a condition that the engine is in a state that torque requested of the engine is smaller than a threshold value, and
the forced induction execution condition includes a condition that the engine is in a state that torque requested of the engine is larger than the threshold value.

9. The hybrid vehicle according to claim 7, wherein
a fully closed state is defined as the prescribed opening smaller than the second opening.

10. The hybrid vehicle according to claim 7, further comprising:
a first actuator that drives the EGR valve in accordance with a command from the controller; and
a second actuator that drives the waste gate valve in accordance with a command from the controller, wherein
the EGR execution condition includes a condition that a first time period has elapsed since issuance of a command to fully open the waste gate valve from the controller to the second actuator, and
the forced induction execution condition includes a condition that a second time period has elapsed since issuance of a command to fully close the EGR valve from the controller to the first actuator.

11. The hybrid vehicle according to claim 7, wherein
the EGR execution condition that a boost pressure of the engine is equal to or lower than a prescribed value, and
the forced induction execution condition includes that the EGR ratio is equal to or lower than a prescribed value.

* * * * *